US012463947B1

(12) United States Patent
Crockett et al.

(10) Patent No.: US 12,463,947 B1
(45) Date of Patent: Nov. 4, 2025

(54) PRIVACY PRESERVING PROTOCOL FOR SERVING USER-SPECIFIC SUPPLEMENTAL CONTENT

(71) Applicant: Amazon Technologies, Inc., Seattle, WA (US)

(72) Inventors: Eric Crockett, Redmond, WA (US); Gang Wang, Frederick, MD (US); Joan Feigenbaum, New York, NY (US)

(73) Assignee: Amazon Technologies, Inc., Seattle, WA (US)

( * ) Notice: Subject to any disclaimer, the term of this patent is extended or adjusted under 35 U.S.C. 154(b) by 330 days.

(21) Appl. No.: 18/333,482

(22) Filed: Jun. 12, 2023

(51) Int. Cl.
*H04L 9/40* (2022.01)
*G06F 21/62* (2013.01)

(52) U.S. Cl.
CPC ...... *H04L 63/0428* (2013.01); *G06F 21/6254* (2013.01); *G06F 21/6263* (2013.01)

(58) Field of Classification Search
CPC ............. H04L 63/0428; G06F 21/6254; G06F 21/6263
See application file for complete search history.

(56) References Cited

U.S. PATENT DOCUMENTS

| | | | |
|---|---|---|---|
| 9,077,539 B2 | 7/2015 | Kamara | |
| 10,237,246 B1 * | 3/2019 | Mulayin | ............... H04L 63/083 |
| 10,423,806 B2 | 9/2019 | Cerezo Sanchez | |
| 2012/0215793 A1 * | 8/2012 | Arsenault | ............... G06F 16/93 |
| | | | 707/736 |
| 2018/0254893 A1 * | 9/2018 | Saxena | ................... H04L 9/083 |
| 2021/0133291 A1 * | 5/2021 | Shapiro | ................. G06F 16/909 |
| 2021/0173854 A1 * | 6/2021 | Wilshinsky | ......... G06F 21/6254 |
| 2023/0214410 A1 * | 7/2023 | Wilshinsky | ......... G06F 16/2237 |
| | | | 707/737 |

(Continued)

OTHER PUBLICATIONS

Giovanni Di Crescenzo, Tal Malkin, and Rafail Ostrovsky. "Single Database Private Information Retrieval Implies Oblivious Transfer". In: International Conference on the Theory and Application of Cryptographic Techniques. 2000.

(Continued)

*Primary Examiner* — Mohammed Waliullah
(74) *Attorney, Agent, or Firm* — Robert C. Kowert; Kowert, Hood, Munyon, Rankin & Goetzel, P.C.

(57) ABSTRACT

Embodiments of a privacy preserving supplemental content server (PPSCS) implements a privacy preserving protocol with a content server that requests the PPSCS to serve supplemental content for users. In embodiments, a user-to-segment map (USM) containing user-private information is split into secret shares and stored separately at the PPSCS and the content server. When servicing a request, the USM data is used to identify a key segment of a user, which is in turn used to select a supplemental content for the user. Advantageously, the selection process is performed according to the privacy preserving protocol, which guarantees that (a) the content server does not learn any user-private information about the user in the USM, (b) the PPSCS learns at most one user segment of the user (e.g. the key segment), and (c) the PPSCS cannot track the user over time using any user-private information about the user learned during the execution.

20 Claims, 10 Drawing Sheets

(56) References Cited

U.S. PATENT DOCUMENTS

2023/0318809 A1* 10/2023 Fox-Epstein ......... H04L 9/0894 713/171

OTHER PUBLICATIONS

Vladimir Kolesnikov et al. Efficient Batched Oblivious PRF with Applications to Private Set Intersection. Cryptology ePrint Archive, Paper 2016/799. https://eprint.iacr.org/2016/799. 2016. doi: 10.1145/2976749. 2978381. url: https://eprint.iacr.org/2016/799.

Samir Jordan Menon and David J. Wu. Spiral: Fast, High-Rate Single-Server PIR via FHE Composition. Cryptology ePrint Archive, Paper 2022/368. https://eprint.iacr.org/2022/368. 2022. url: https://eprint. iacr.org/2022/368.

Payman Mohassel and Yupeng Zhang. SecureML: A System for Scalable Privacy-Preserving Machine Learning. Cryptology ePrint Archive, Paper 2017/396. https://eprint.iacr.org/2017/396. 2017. url: https://eprint.iacr.org/2017/396.

Deevashwer Rathee, Thomas Schneider, and K. K. Shukla. Improved Multiplication Triple Generation over Rings via RLWE-based AHE. Cryptology ePrint Archive, Paper 2019/577. https://eprint.iacr.org/2019/577. 2019. doi: 10.1007/978-3-030-31578-8_19. url: https://eprint.iacr.org/2019/577.

[HbT'23] Headerbidding Team, "What Is A SafeFrame and How Does It Help Publishers?," https://headerbidding.co/safeframe-for-publishers/.

[HK'23] Florian Hartmann and Peter Kairouz, "Distributed differential privacy for federated learning," Google Research blog, https://ai.googleblog.com/2023/03/distributed-differential-privacy-for.html.

[PSSW'09] Benny Pinkas, Thomas Schneider, Nigel P. Smart, and Stephen C. Williams, "Secure Two-Party Computation is Practical," https://eprint.iacr.org/2009/314.pdf.

* cited by examiner

PRIVACY PRESERVING PROTOCOL FOR SERVING USER-SPECIFIC SUPPLEMENTAL CONTENT

BACKGROUND

Content servers (e.g. a primary web server hosting a website) often use supplemental content servers (e.g. a secondary web server) to serve user-specific content to users. The task of matching content to user segments and serving user-specific content to users is complex and may not be the core business of the content server operator. Thus, a third-party supplemental content service may be used to facilitate the process of selecting user-specific supplemental content to users. The supplemental content server may use a user-to-segment map that associates user IDs with user segments and/or categories for content selection purposes.

However, current implementations of supplemental content services do not sufficiently protect user privacy, because user-private data such as the user-to-segment map are stored on the servers of the third-party supplement content service and visible to the service. Even when the user segment data is encrypted, a supplemental content server could deduce the segments of a user over time, by observing the intermediate data of many service calls. The parties would generally like to avoid leaking such proprietary user-private information when serving user-specific content.

Figure 1:
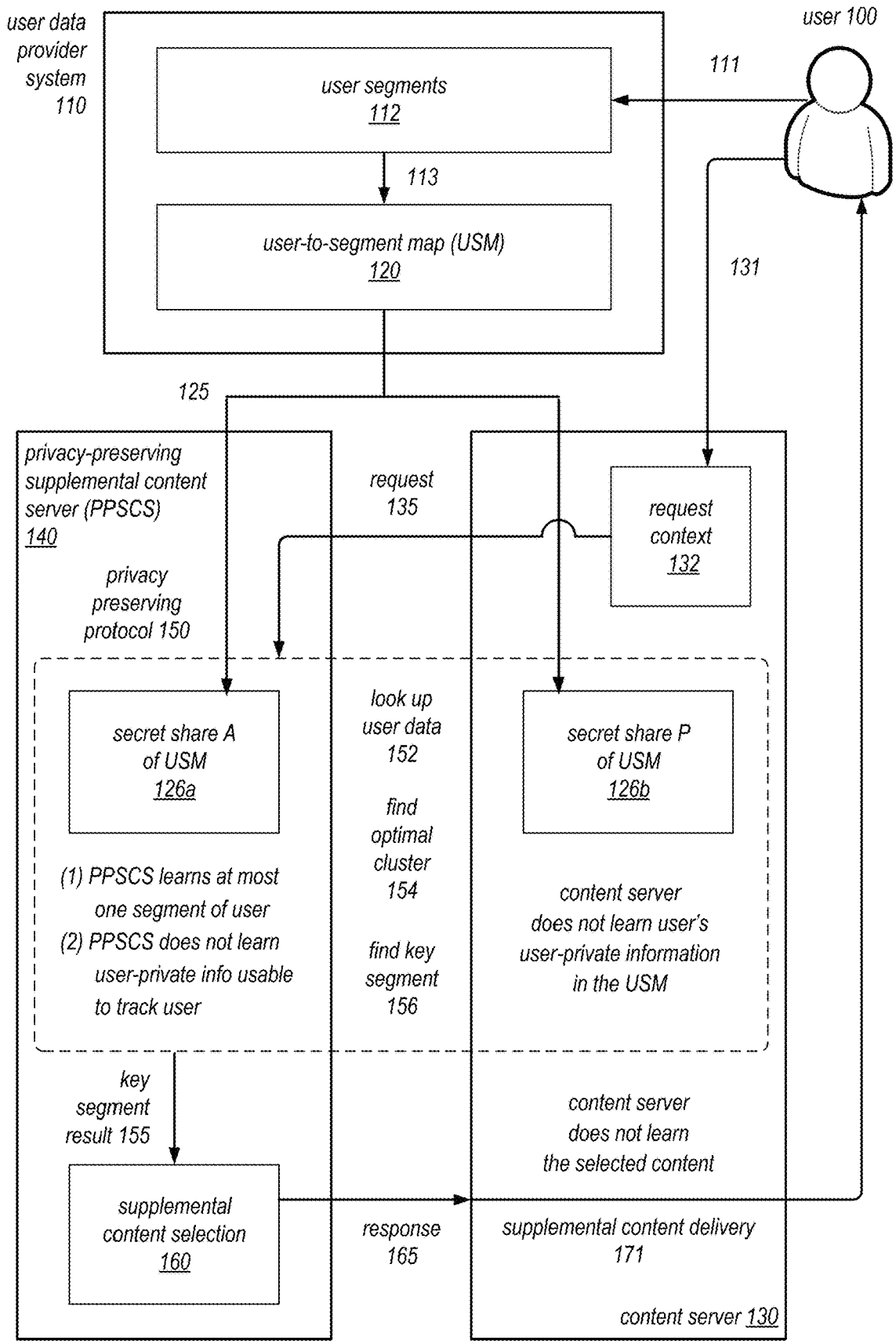
FIG. 1 is illustrating a privacy-preserving supplemental content server (PPSCS) and an associated content server that implement a privacy preserving protocol to select user-specific supplemental content that avoids leaking of user-private information across the two systems, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Content servers (e.g. a primary web server hosting a website) often use supplemental content servers (e.g. a secondary web server) operated by a different party to serve user-specific content to users. In systems that employ computer systems of multiple parties to handle user-private information (e.g. a primary content server and a supplemental content server), leakage of the user-private information across the parties is possible through the use of relatively simple techniques such as request tracking. Current implementations of multi-party content provider systems do not provide sufficient privacy guarantees against such leakages, which undermines and compromises the data privacy of users. Moreover, any privacy preserving strategy to prevent user data leakage must operate in an efficient manner, as the content request and response interactions must typically be completed within a few seconds.

To address these and other problems in the state of the art, this disclosure describes embodiments of a privacy preserving protocol between the primary content server and a supplemental content server to provide guarantees against the leakage of user-private information used to select user-specific supplemental content.

In embodiments, the protocol is implemented as a two-phase secure cryptographic process. In an initial offline phase, one party creates a user-to-segment map (USM) that maps a user identifier to a list of user segments associated with the user, generates two secret shares of the USM, and distributes one secret share to each of the content server and the supplemental content server. In some embodiments, the user segments may be encoded in a machine learned embedding reduce each user segment into a vector in a vector space $\mathcal{V}$.

In the online phase, a user u visits the content server, and the content server sends to the supplemental content server a content request and a request context about where the supplemental content will be displayed. If the user is not in the USM, $u \notin M$, the supplemental content server may serve a supplemental content that is not user-specific. If $u \in M$, the supplemental content server uses a machine learning algorithm to embed the request into $\mathcal{V}$. The supplemental content server then computes the dot product between the request embedding and each user segment in M[u], and serves a supplemental content corresponding to the user segment with the maximal dot product, which should also correspond to the supplemental content that maximizes some objective function.

In some embodiments, to enhance the execution performance and privacy preservation capabilities of the process, the user segments are grouped into segment clusters based on a clustering algorithm. Thus, the USM secret shares will indicate mappings from users to their associated segment clusters, and the segment embeddings are generated from the centroids of the individual clusters. While the clustering approach may only provide an approximately optimal segment of the user in view of the request context, it drastically reduces the execution time of the content selection process and the amount of storage that must be managed by the supplemental content server. In some embodiments, to place a bound on the size of the USM, the USM is implemented as a Cuckoo hash table.

In some embodiments, the privacy preserving protocol uses a variety of cryptographic techniques such as secret sharing, oblivious transfer, multi-party computations (MPCs) such as garbled circuits and Beaver Triples, to perform the supplemental content selection process to ensure that no user-identifying information is learned by either the content server or the supplemental content server. In some embodiments, each time USM data is used by the protocol, the protocol will re-randomize the secret shares of the user data so that neither the content server or the supplemental content server can effectively track the user across multiple content requests. In some embodiments, the protocol adds an additional layer of indirection to the content selection process, to improve the performance of the cryptographic protocol without sacrificing the utility of the content selection process.

Embodiments of the privacy preserving protocol provides a number of user privacy guarantees for the supplemental content selection process, in particular:

The content server does not learn whether the user is in the USM data set.
The content server does not learn anything about the user's interests (e.g., via user segments associated with the user).
The content server does not learn which supplemental content is served to the user.
The supplemental content server cannot track users over time using the protocol.
The supplemental content server learns no user-identifying information when serving a supplemental content. It only learns either:
  that the (anonymous) user is not in the USM data set, or
  a user segment associated with the (anonymous) user, for which a supplemental content is served.
The supplemental content server learns at most one user segment associated with a user per request.

As may be understood and appreciated by those skilled in the art, the privacy preserving protocols described herein are implemented as specialized computer systems to improve the functioning of existing computer systems that perform user-specific supplemental content selection. The disclosed systems implement a practical application to enable the selection of supplemental content without leaking user-private information at the content server or the supplemental content server. Moreover, the disclosed systems implement various features to improve execution performance of the content selection process, including to reduce request latency, data storage usage, and network usage. These features are designed to solve technical problems rooted in the computer systems, and are not intended to capture any human mental or pen-and-paper processes, basic methods of organizing human activity such as fundamental economic practices, pure mathematical processes and formulas, or any other exceptions to patent-eligible subject matter recognized by the courts. These features and advantages of the disclosed systems are described in further detail below, in connection with the figures.

FIG. 1 is illustrating a privacy-preserving supplemental content server (PPSCS) and an associated content server that implement a privacy preserving protocol to select user-specific supplemental content that avoids leaking of user-private information across the two systems, according to some embodiments.

As shown, the figure depicts a user data provider system 110. Depending on the embodiment, the user data provider system 100 may be operated by the operator of the content server 130, the operator of the (e.g. a shopping website of a company A), the operator of the supplemental content server 140, or a third party company (e.g. a distinct company B). A user 100 (e.g. a customer of company A or B) may interact 111 with the user data provider system 110 via a user device, which allows the user data provider to learn user-private data about the user. For example, the user data provider system 110 my store user segments 112 of the user 100 as result of the interactions. The user segments 112 may be specific to the user data provider, and include indicators such as "the user has purchased product X," "the user is interested in product Y," and the like. Other types of user segments may be more generalized, and correspond to user demographic categories, etc. These user segments 112 will be used to select user-specific supplemental content for the user 100, either when the user returns to the user data provider system or when the user visits a different content publisher system (e.g. a third-party social media website, video stream service, gaming service, etc.).

In some embodiments, a user-to-segment map (USM) 120 is constructed 113 (and maintained) by the user data provider system 110, which captures the relationship between the user and segments corresponding to the user. As shown, the USM 120 is used to generate 125 two secret shares A 126a and P 126b. In some embodiments, the initial secret shares 126 may be generated by software provided to the user data provider by the PPSCS operator. These secret shares are deployed to the privacy preserving supplemental content server (PPSCS) 140 and the content server 130 during an initial or offline phase of the process. In some embodiments, these secret shares 126 may themselves be ciphertext so that the system holding the secret share cannot learn any information in the USM 120. However, as shown, the PPSCS 140 and the publisher system 130 will use these secret shares 126 to execute a privacy preserving protocol 150 to select the supplemental content for the user during an online phase of the process.

In some embodiments, the USM 120 may be implemented as a hash table where a user identifier is used as a key to look up a user data vector. The user data vector will indicate which segments are associated with the user. In some embodiments, both the key and the value portion of every entry in the hash table are secret shared, so that each side of the process will have secret share values for each user ID and user data vector. In some embodiments, the privacy preserving protocol will re-randomize or generate fresh secret shares for values in the USM whenever a value is looked up or used during the protocol, so that neither side of the protocol can track any piece of data (e.g. a particular user ID) used during the protocol. In some embodiments, to limit the size of the hash table, the hash table will use a Cuckoo hashing scheme.

As shown, in the online phase of the process, the user 100 may interact 131 with the content server 130, which may be operated by the same or a different entity from the operator of the user data provider system 110. In some embodiments, the PPSCS 140 is operated by an operator (e.g. company C) that is distinct from both the user data provider and the content server 130 operator.

In some embodiments, the content server 130 will identify the user 100. The user may be recognized based on common user identity data that is known to both the content server 140 and the user data provider system 110. Such common user identity data may include a user device ID associated with the user, the user's email address or phone number, or a cookie placed on the user device by the user data provider system 110 or the content server 130.

When the user is interacting 131 with the content server 130, the system may determine that there is an opening to present a user-specific supplemental content to the user. To obtain the supplemental content, the content server 130 will send a content request 135 to the PPSCS 140. As shown, in some embodiments, the request will include a request context 132 determined by the content server. Depending on the embodiment, the request context 132 may include context information such as the content being played when the request was generated (e.g. text, photo, music, video, gaming content), the time of the request, user actions immediately before the request, etc. In some embodiments, the request context may indicate an address where the content server's content can be accessed by the PPSCS, so that the PPSCS can programmatically crawl the content (e.g. a webpage) to extract relevant contextual information.

As shown, in response to the request 135, the PPSCS 140 will execute its side of the privacy preserving protocol 150 to ultimately select the best supplemental content for the user, depending on the user's known segments and the request context. Depending on the embodiment, the protocol 150 will involve a number of network messages between the content server and the supplemental content server, to securely perform a number of steps. These steps may include looking up user data 152 in the correct Cuckoo buckets in the USM, finding the optimal segment cluster 154 of the user depending on the request context, and then finding the individual target segment 156 of the user to use to select the supplemental content. These steps may be performed using a combination of cryptographic or privacy protection techniques and/or protocols, such as oblivious transfer, secret share re-randomization, multi-party computations, etc., so that neither side of the protocol ever learns the user-private data of the user in the USM. Additionally, any intermediate data generated during the protocol are also secret shared so that neither side learns the cleartext values of these variables. In some embodiments, the software used to perform the content server side of the protocol 150 may be provided by the PPSCS operator.

As shown, embodiments of the privacy preserver protocol 150 provides a number of user privacy guarantees. On the PPSCS side, the protocol 150 guarantees that the PPSCS learns at most one segment of the user (i.e. the key segment used to choose the supplemental content). The protocol 150 additionally guarantees that the PPSCS does not learn any user-private information (e.g. a persistent segment ID) during execution of the protocol that can be used to track the user over multiple content requests. On the content server side, the protocol 150 guarantees that the content server does not learn any of the user's private information stored in the USM. For example, the content server does not learn whether the user is a known user in the USM dataset.

As shown in this example, once the key segment result 155 is determined using the privacy preserving protocol 150, the result is used by a supplemental content selection component 160 to select the supplemental content to serve to the user. In some embodiments, if the result 155 does not indicate a specific key segment of the user (either because the user is unknown in the USM or no key segment of the user represents a sufficient match to the request context), the supplemental content selector 160 will simply select a supplemental content that is not specific for the user.

In some embodiments, the privacy preserving protocol 150 may be implemented so that the key segment is selected based on randomization input from the content server, so that the supplemental content server cannot deterministically learn information about the user based on the sorting of the clusters. For example, the content server may supply a random bit string with each request that is of the same size as the cluster membership string of the user. The two bit strings can be combined with an bitwise AND so that the selection of the optimal cluster is randomized from request to request.

As shown, the supplemental content selected by the PPSCS 140 is returned in a content response 165 to the content server 130, which will in turn deliver the content 171 to the user's user device. The receipt and delivery of the supplemental content is performed in a way such that the content server 130 cannot learn or observe the selected content. For example, the actual supplemental content and any associated metadata may be encrypted so that it cannot be observed by the content server 130 but can be observed by the user device. In this manner, the content server 130 is prevented from tracking the supplemental content served to the user over many content requests, to deduce user-private information about the user 100. In some embodiments, the PPSCS 140 will transmit the response 165 directly to the user device without the content server 130 ever receiving the ad.

Secret Sharing of User-to-Segment Map

Figure 2A:
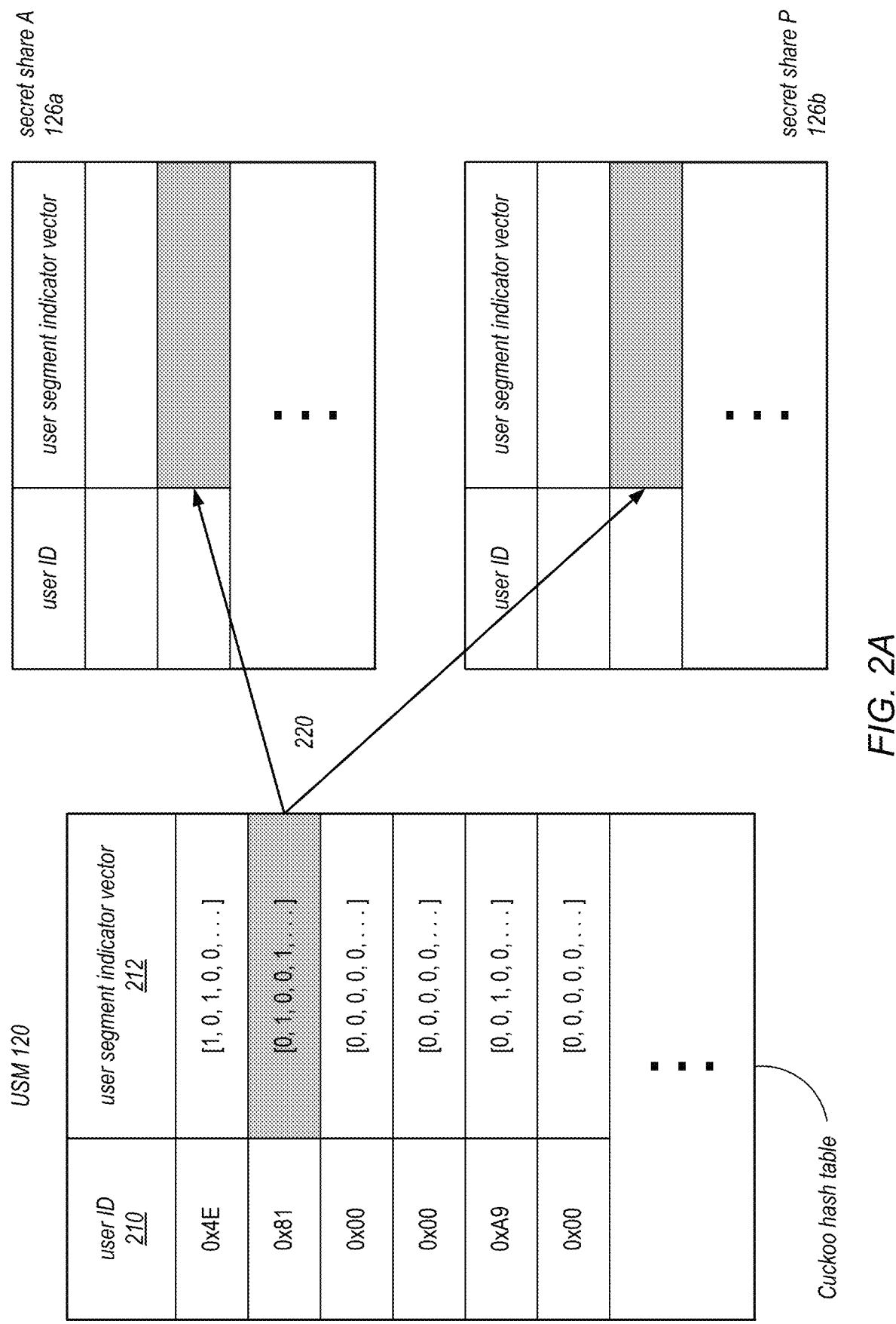
FIG. 2A illustrates a secret sharing technique used by the privacy preserving protocol, according to some embodiments.

FIG. 2A illustrates a secret sharing technique used by the privacy preserving protocol, according to some embodiments.

As shown, in some embodiments, the USM 120 (and its secret shares 126a and 126b) will store a mapping from user IDs 210 to user segment indicator vectors 212. The user segment indicator vectors 212 are Boolean value vectors (e.g. bit vectors) where a zero means the user is not associated with a user segment at the vector index, or a one if the user is associated with the user segment at the vector index. In some embodiments, use of the Boolean indicator vectors 212 will help reduce resource usage (e.g. compute memory usage) during execution of the protocol 150. As will be discussed below, in some embodiments, the USM shares will store a mapping of individual users to individual clusters of segments. In such embodiments, the indicator vectors 212 will indicate user associations with each of a set of segment clusters (e.g. indicating 1 if the user is associated with any segment in a given cluster, and 0 otherwise).

As shown, in some embodiments, the USM entries are stored in a Cuckoo hash table. Cuckoo hashing is a technique for resolving hash collisions in a hash table/map. The important properties of Cuckoo hashing are as follows:

1. A cuckoo hash table is parameterized by a small integer k>1, e.g., k=2 or k=3, a set of (non-cryptographic) hash functions $h_0, \ldots, h_{k-1}$, and the number of rows in the table N.
2. If a key x is in a cuckoo hash table, it is exactly one of k positions, specifically $h_i(x)$ mod N for $1 \leq i < k$. Thus the key can looked up in constant time by examining k positions.
3. Each row of a cuckoo hash table holds at most one key/value pair.

In a preferred embodiment, the cuckoo hash table is implemented with k=3 hash functions, which may provide better protection against user data leakage. In some embodiments, the table size may be chosen to be a power of two so that the load factor of the table $|M|/|T| < 0.9$.

The secret sharing operation 220 will be performed for each key and value in the hash table, so that the table secret shares 126a and 126b will hold secret shares for each key and value of the original USM 120. The secret sharing technique used may vary depending on the embodiment. For example, in some embodiments, the secret sharing may be performed so that when an original value in the USM 120 can be obtained from a bitwise XOR of the two secret share values in the secret share tables 126a and 126b.

In some embodiments, the secret sharing operation 220 may employ an additive secret sharing technique. Formally, let A and B be two parties who wish to compute secret shares of a value $x \in \mathbb{Z}_q$ for q>0. The generation of one secret share of x may be expressed as $\langle x \rangle_A \xleftarrow{\$} \mathbb{Z}_q$ and generation of the other secret share of x may be expressed as $\langle x \rangle_B \zeta x - \langle x \rangle_A \in \mathbb{Z}_q$. Note that $\langle x \rangle_A + \langle x \rangle_B = x$, and if $y \in \mathbb{Z}_q$, $\langle x \rangle_A + \langle y \rangle_A = \langle x+y \rangle_A$, and $\langle x \rangle_B + \langle y \rangle_B = \langle x+y \rangle_B$.

In some cases, the protocol 150 will generate fresh secret shares for the same value. A fresh secret share of x may be denoted as $\langle x \rangle'_A$, which is independent of $\langle x \rangle_A$. In the rest of this document, the notation $\langle s_u \rangle_A$ may be used to mean $\{\langle s_{u,c} \rangle_A\}_{C \in C}$, and $\langle s_u \rangle$ may be used when the party is clear from context.

Figure 2B:
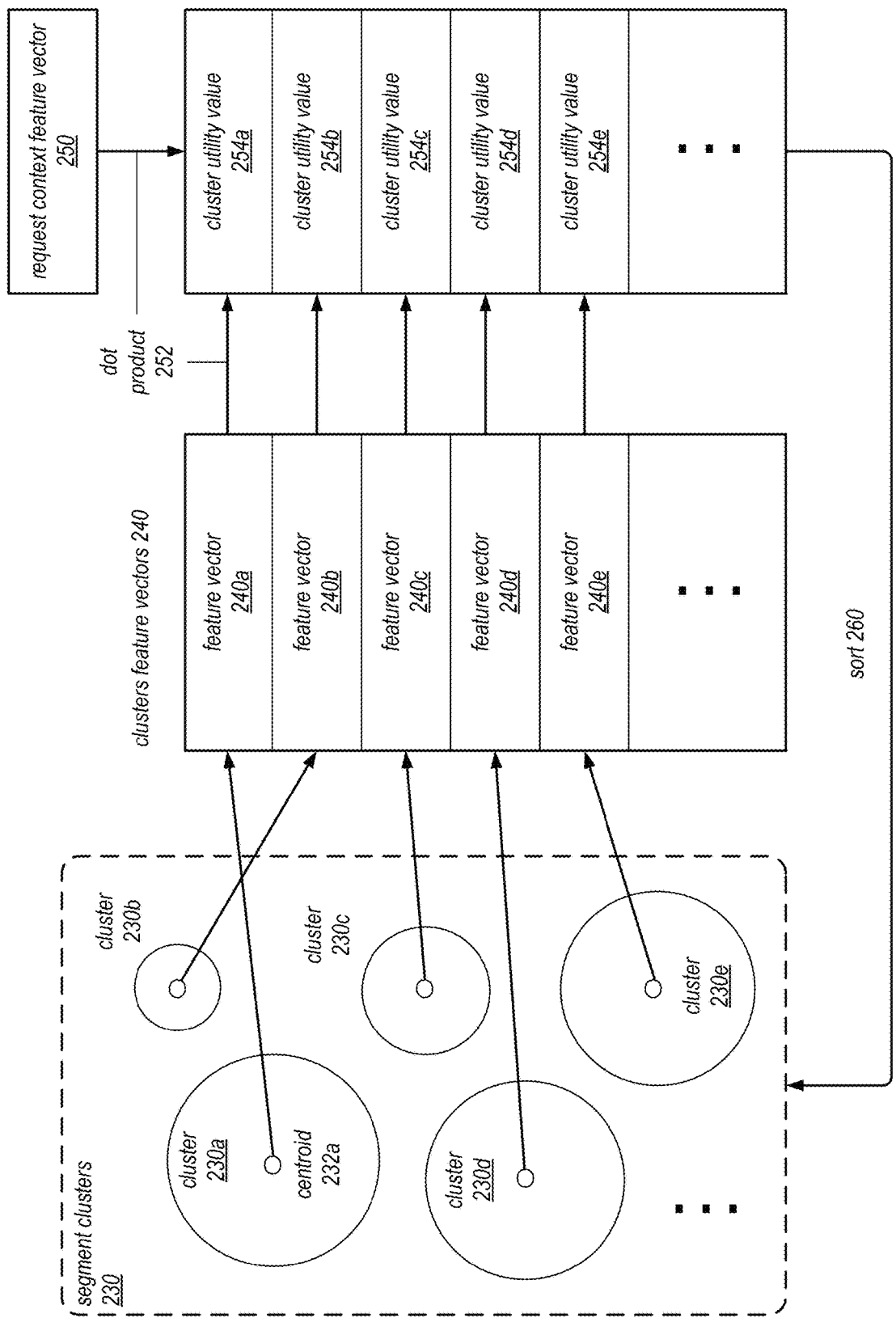
FIG. 2B illustrates a user segment clustering technique used by the PPSCS to select supplemental content based on a request context, according to some embodiments.

Once two secret shares of a value are initially generated, fresh shares can be periodically regenerated via a re-randomization protocol. Let A and B be two parties who with corresponding secret shares $\langle x \rangle_A$ and $\langle x \rangle_B$ of a value $x \in \mathbb{Z}_q$. A re-randomization generates fresh (independent) secret shares $\langle x \rangle'_A$ and $\langle x \rangle'_B$ of x. The re-randomization can be realized using the following protocol:

1. Party A choses $(x)'_A = y \xleftarrow{\$} \mathbb{Z}_q$
2. Party A computes $(x)_A - y$ and sends this to Party B
3. Party B computes $(x)'_B = (x)_B + ((x)_A - y) = x - y$ User Segment Clustering FIG. 2B illustrates a user segment clustering technique used by the PPSCS to select supplemental content based on a request context, according to some embodiments.

As discussed, in some embodiments of the privacy preserving protocol 150, the user segments are grouped into clusters, either by the user data provider system 110 or at the PPSCS 140. The clustering is done in part to facilitate more performant execution of the multi-party computations and enable efficient resource usage, and in part to enhance the secrecy protections of the protocol. For example, when the supplemental content server computes cluster utility values between the request and the user's segments (using a dot product), in order to prevent the supplemental content server from being able to re-identify the user based on user-private data, the cryptographic protocol will require that the PPSCS computations be user agnostic.

One approach to solving the problem is to have the PPSCS compute the dot product between the request and all user segments, and then later compute the maximal dot product only over the user segments relevant to the user (again, in a user-agnostic fashion). This approach may be used for some embodiments of the protocol 150. However, large advertisers could have upwards of tens or hundreds of thousands of user segments, so computing that many dot products could be prohibitively expensive in the online cryptographic protocol. To reduce resource costs, in some embodiments, the user segments are clustered in the USM secret shares. In some embodiments, the segment clustering may be performed by the PPSCS operator (e.g. as an offline step), using a clustering algorithm such as k-nearest neighbors (k-NN), to group user segments into a smaller number of clusters 230. After clustering user segments, the PPSCS computes an embedding (cluster feature vector 240) of the cluster by determining an average of the user segment embeddings (a centroid 230) of all user segments in the cluster.

As shown in the figure, the user segments in the USM are first clustered into a set of segment clusters 230a-e. An averaging of member feature vectors in each cluster is performed to determine centroids 232a-e of each cluster, which are stored as the cluster feature vectors 240a-e. These cluster feature vectors 240 are then combined with the request context feature vector 250 using a dot product operation 252, to obtain the cluster utility values 254a-e for each segment cluster in view of the ad context. In some embodiments, the request context feature vector 250 may be computed by the PPSCS 140, during the online phase of the protocol 150. In some embodiments, the clusters 230a-e are sorted 260 based on their cluster utility values 254a-e, so that later portions of the protocol can prioritize the clusters when targeting the user.

An embodiment of the clustering step is described more formally as follows. Let $U = \{0,13\}^m$ be the user domain and $U_A \subseteq U$ be the set of users known to the advertiser.

Let $\mathcal{S}$ be the set of user segments and be the domain of requests. In some embodiments, the PPSCS operator may use machine learning to embed signal information about the request context and/or user segment features into a vector space. Let $\sigma: \mathcal{R} \cup \mathcal{S} \to \mathcal{V}$ be an embedding from requests and user segments to a real vector space $\mathcal{V} \subseteq \mathbb{R}^n$.

Let $\mathcal{C}$ be the set of clusters used by the PPSCS (e.g. PPSCS 140). Each cluster $c \in \mathcal{C}$ is a set of user segments, i.e., $c \subseteq \mathcal{S}$. The cluster centroid of c may be written as $$\sigma(c) = \frac{1}{|c|} \cdot \sum_{x \in c} \sigma(x).$$

In the offline phase, a number of clusters $q \geq |\mathcal{C}+1|$ and an injective mapping $\varphi: \mathcal{S} \to \mathbb{Z}_q \{0\}$ is chosen. For each user $u \in \mathcal{U}_A$, a vector $s_u = \{s_{u,c} \in \mathbb{Z}_q\}_{c \in \mathcal{C}_q}\}_{C \in C}$ is created where $s_{u,c} = 0$ if u is not associated with any user segment in u, and $s_{u,c} = \varphi(x)$ for some user segment $x \in c$ associated with u, otherwise. A map M from user IDs u is then created to cluster affiliations $s_u$. Secret shares of this map (e.g. USM 120) are stored at the PPSCS 140 and the content server 130. The user IDs are assumed to have a fixed width. If they do not, they are replaced with hash values of a fixed width.

In the online phase, the PPSCS computes the dot product between the request and each cluster $c \in \mathcal{C}$, which is an approximation of the dot product between the request and each user segment in the cluster. The dot products reveal which cluster would maximize an objective function for a given request context. However, it is noted that in some embodiments, the dot products do not depend on any user-specific information, so the cluster with the maximal dot product does not necessarily maximize the objective function for this user. Instead, for a content request r∈R, the PPSCS will serve a supplemental content for the user segment $s_{u,c}$ for the highest-value cluster $\bar{c}$. such that $s_{u,\bar{c}} \neq 0$, i.e., $$\bar{c} \in \operatorname{argmax}_{c \in \mathcal{C}} (\sigma(r)^T \cdot \sigma(c) | s_{u,c} \neq 0)$$

If the argmax is ∅ (i.e., $s_{u,c}=0$ for all c∈ $\mathcal{C}$ ), the PPSCS can serve an arbitrary supplemental content that is not specific to the user.

It is noted that even without clustering, computing the optimal supplemental content can be an imprecise process, for example, because σ is imperfect. Thus, even without clustering, the content that is ultimately selected may not necessarily maximize the objective function. The addition of clustering, however, introduces two new approximations.

First, PPSCS must pick at most one user segment $s_{u,c}$ to select the content per user/cluster combination. Thus, if a user is affiliated with two or more user segments that are part of the same cluster, it is possible that in some contexts, the optimal content would correspond to some user segment x∈c other than $s_{u,c}$. The probability of this event is controlled by the number of user segments in each cluster; use of fewer user segments reduces the probability of such a collision. Second, the cluster centroid represents the embedding of each user segment in the cluster. However, depending on the details of the clustering algorithm, the embedding algorithm, and the exact distribution of the user segment embeddings, it is possible that this algorithm could select cluster $C_1$ when in fact the optimal content would be for a user segment in cluster $C_2$. However, it is empirically observed that these approximations introduced by the clustering do not significantly reduce the average utility of the selected content.

Note that although the user data provider may know the clusters, it does not receive any user-identifying data at any point in the protocol. Similarly, if the PPSCS serves an ad directly to the user, the content server 140 learns nothing about the user from the protocol because it never receives any information from the USM or the PPSCS. The PPSCS, on the other hand, still learns a mapping between (possibly pseudorandom) user identifiers and user segments associated with those users. Furthermore, in the online phase, the PPSCS learns which user a content is being served to, as well as the request context for the content (e.g., the contents of a webpage on which the supplemental content will be displayed). Thus, the PPSCS learns significant user-identifying information. To address these undesired leakages, the cryptographic protocol 150 is used to prevent the PPSCS from learning anything about the user to which it serves the supplemental content.

Cryptographic Techniques

Depending on the embodiment, the cryptographic protocol 150 may use a number of cryptographic techniques and/or protocols, which are briefly described below.

Beaver Triples. Given secret shares of x, y ∈ $\mathbb{Z}_q$, the Beaver Triples (BT) protocol can be used among two parties to securely compute secret shares of a product z=x·y. The BT protocol assumes that the two parties A and B have secret shares of three values a, b, c ∈ $\mathbb{Z}_q$ where c=a·b. During the protocol, party A computes:

$$\langle d \rangle_A = \langle a \rangle_A + \langle x \rangle_A = \langle a+x \rangle_A$$

$$\langle e \rangle_A = \langle b \rangle_A + \langle y \rangle_A = \langle b+y \rangle_A$$

and sends both values to B.

Party B then computes the following and sends d and e to A.

$$d = \langle a \rangle_B + \langle x \rangle_B + \langle a \rangle_A$$

$$e = \langle b \rangle_B + \langle y \rangle_B + \langle e \rangle_A$$

$$\langle z \rangle_B = d \cdot \langle y \rangle_B + (-e) \cdot \langle a \rangle_B + \langle c \rangle_B$$

Finally, Party A computes:

$$\langle z \rangle_A = d \cdot \langle y \rangle_A + (-e) \cdot \langle a \rangle_A + \langle c \rangle_A$$

Extension to Dot Products and Matrices. The BT protocol immediately extends to computing the dot product of two vectors $\vec{x}$, $\vec{y}$ of length n using n Beaver Triples. After executing the protocol above for each vector component, each party will have ($x_i$, $y_i$) for 0≤i<n. The parties can then compute $$\sum_{i=0}^{n-1} (x_i, y_i)$$

to obtain secret shares of the dot product.

While the same technique works for matrix multiplication, there is a more efficient protocol that may be used with the privacy preserving protocol 150. Let X ∈ $\mathbb{Z}_q^{m \times k}$ and Y ∈ $\mathbb{Z}_q^{m \times k}$ be matrices, and suppose both parties have component-wise secret shares of the matrices ⟨X⟩ and ⟨Y⟩. The two parties are assumed to have secret shares of three matrices A, B, and C, where A ∈ $\mathbb{Z}_q^{m \times k}$→\$, B ∈ $\mathbb{Z}_q^{m \times k}$→\$, and C=A·B. The two parties can then compute ⟨X·Y⟩ as follows. First, both parties compute:

$$\langle D \rangle = \langle X \rangle - \langle A \rangle = \langle X-A \rangle$$

$$\langle E \rangle = \langle Y \rangle - \langle B \rangle = \langle Y-B \rangle$$

The parties then share these values so that they can both reconstruct D=X−A and E=Y−B. Finally, the parties can compute, using their respective secret shares:

$$\langle Z \rangle = \langle X \rangle \cdot E + \langle D \rangle \cdot \langle Y \rangle + \langle C \rangle - D \cdot \langle E \rangle$$

In some embodiments, the above process may be tweaked to remove one matrix multiplication by having only one party compute the last term −D·⟨E⟩.

In some embodiments, the content server and the supplemental content server will pre-generate a |$\mathcal{C}$| scalar Beaver Triples and Beaver Triples for a |$\mathcal{C}$|× k-by- k×1 matrix multiplication. These values can be generated in advance of a content request, for example during the offline stage of the protocol. In some embodiments, the value q may be set to the smallest power of two >|$\mathcal{S}$|, and the Beaver Triples may be generated using the method described by Rathee et al.

Two-Party Computation. A two-party protocol Π between party $P_L$ and party $P_R$ is described as a function denoted by f: {0,1}*×{0,1}*→{0,1}*×{0,1}*, where f=($f_L$, $f_R$). For every input pair ($x_L$, $X_R$) to the function, the output is a pair ($f_L$($X_L$, $X_R$), $f_R$($X_L$, $X_R$)), where $P_L$ supplies $x_L$ and receives $f_L$($X_L$, $X_R$) and $P_R$ supplies $X_R$ and receives $f_R$($x_L$, $x_R$).

For a two-party computation f, protocol Π securely computes f in the presence of a non-adaptive, semi-honest adversary when there exist a pair of polynomial-time algorithms $Sim_L$, $Sim_R$ such that:

$$\{Sim_L(X_L, f_L(X_L, X_R))\}_{W_L, X_R} \stackrel{c}{\equiv} \{View_L^\Pi(x_L, X_R)\}_{X_L, Xdi}$$
R, and $$\{Sim_R(X_R, f_R(X_L, X_R))\}_{x_L, x_R} \stackrel{c}{\equiv} \{View_R^\Pi(x_L, x_R)\}_{X_L, X_R},$$

where party $P_i$'s view during the execution of $\Pi$ on inputs $X_L$, $X_R$ is denoted by $View_i^\Pi(x_L, X_R)$ and includes $P_i$'s input $x_i$, randomness used by $P_i$, and all messages received from the other party.

Oblivious Transfer. Oblivious transfer (OT) is a two-party protocol with a sender and a receiver. In 1-out-of-m OT, the sender has m>1 values $x_i$, $0 \le i < m$. The receiver requests an index i and learns $x_i$ and nothing else. The transfer is captured by the two-party function $F^{OT}$ (i, $\{x_i\}_{0 \le i < m}) \to (x_i, \perp)$.

There are a number of possible options for implementing OT. One option is the single-database symmetrically private information retrieval (SPIR) technique described by Crescenzo et al. Another option is the oblivious pseudorandom functions (OPRF) technique described by Kolesnikov et al. In the Kolesnikov protocol, the sender learns a set of random strings (which it does not control), while the receiver learns one of the random strings. This can be extended to a (chosen) one-out-of-N protocol by using each of the random strings as an encryption key for a chosen string. Thus the sender encrypts the entire database, each entry with a different key, and sends the encrypted database to the receiver. The receiver can decrypt exactly one element of the database. A variant of the symmetric private information retrieval technique is described by Menon et al (SPIRAL). The SPIRAL scheme uses a special structure which enables a more efficient randomized oblivious secret share extraction protocol than a generic OT scheme.

Randomized Oblivious Secret Share Extraction. In some embodiments, the protocol 150 will use a new two-party computation called randomized oblivious secret share extraction (ROSSE), which is described below. In essence, the ROSSE protocol performs an oblivious transfer of data at a particular index of a table from one part to another, and then re-randomizes the secret shares of the data at both parties.

Let R be a ring. In the ROSSE protocol, party A has a table T containing a secret share $\langle T[i] \rangle_A \in R$ at each index $0 \le i < |T|$. Party B knows an index i and a corresponding secret share $\langle T[\hat{i}] \rangle_B$. By executing the ROSSE protocol, both parties will learn a fresh, independent secret share for T [i], and nothing else. The ROSSE protocol is described by the function $$f^{ROSSE}((T)_A, \hat{i}, \langle T[\hat{i}] \rangle_B)) \to (\langle T[\hat{i}] \rangle'_A, \langle T[\hat{i}] \rangle'_B).$$

The ROSSE functionality may be realized using a combination of any one-out-of-|T| oblivious transfer protocol and secret share re-randomization. First, the sender generates $x \in \mathbb{Z}_q$. Next, the two parties execute an OT protocol where party A acts at the OT sender of values $\langle T[i] \rangle_A - x$, $0 \le i < |T|$, and party B acts as the OT receiver for a single index $\hat{i}$. Party B receives the value $\langle T[i] \rangle_A - x$, and then computes a fresh secret share of T [$\hat{i}$] as:

$$\langle T[\hat{i}] \rangle'_B = \langle T[\hat{i}] \rangle_B + (\langle T[\hat{i}] \rangle_A - x) = \langle T[\hat{i}] \rangle - x$$

Party A's corresponding secret share (for an unknown $\hat{i}$) is $\langle T[\hat{i}] \rangle'_A = x$.

Note that while the ROSSE protocol above can work with any OT protocol, specific OT protocols may enable a more efficient implementation. In particular, in the SPIRAL scheme described by Menon et al, the OT response is a single ciphertext of a fully-homomorphic encryption scheme encrypting the target row of the database T. Fully homomorphic encryption schemes admit operations on encrypted data, thus the OT sender/PIR server can subtract the randomness x from just the encrypted OT response rather than subtracting it from each (plaintext) database record.

Two-Party Computation Using Garbled Circuits. A garbled circuit (GC) protocol may be used to perform a two-party computation (2PC) among two semi-honest parties, in a single round trip. Garbled circuit protocols involve a garbler and an evaluator. As a simple example, a simple AND gate, i.e., f (x, y)=x∧y, can be evaluated using a GC protocol. For simplicity, the example assumes that the garbler knows its input bit $b_G$. The garbler sends encrypted output values for each possible value of the evaluator's input bit $b_E$. The garbler creates labels $l_0$ and $l_1$ which represent the two possible values for the evaluator's input. The evaluator will learn exactly one of these labels, so the labels are used as keys to encrypt the corresponding output bit of the circuit using a key-committing encryption scheme. Thus, the label $l_i$ corresponding to $b_E$=i is used to encrypt $b_G \wedge i$. The garbler sends Enc ($l_0$, $b_G \wedge 0$) and Enc ($l_1$, $b_G \wedge 1$) to the evaluator. The evaluator executes a 1-out-of-2 random oblivious transfer with the garbler to retrieve the label corresponding to its input bit $b_E$, then attempts to decrypt both ciphertexts. Exactly one of the ciphertexts will successfully decrypt, and will reveal the output bit to the evaluator.

Note that the first message of the OT does not depend on the circuit itself, thus the process can be executed in a single round trip by having the evaluator initiate the OTs for its input. The garbler responds with the ciphertexts and the OT response, which enables the evaluator to learn the result.

An Embodiment of the Privacy Preserving Protocol

An embodiment of the privacy preserving protocol 150 of FIG. 1 will now be described. As discussed, one of the goals of the cryptographic protocol is to ensure that the PPSCS 140 does not learn any identifying information about the user to which it is serving supplemental content. In particular, the PPSCS should not learn any persistent user identifier. In some embodiments, it may be necessary for the PPSCS to learn at least one user segment associated with the user because the PPSCS uses a specific key segment of the user to select a specific supplemental content. However, the PPSCS should not learn any additional user segments associated with the user.

In some embodiments, the privacy preserving protocol 150 may be used between a publisher system (e.g. a website) and an ad server to select targeted ads for users that visit the website. Thus, the content server 140 may be a web server hosting the website, and the PPSCS 140 may be an ad server of an ad tech company that serves ads for many advertisers. In some embodiments, the user data provider system 110 of FIG. 1 may be operated by an advertiser that uses the ad tech company. The protocol 150 may be initiated by an ad request (e.g. request 135) from the publisher system, and the ad response (e.g. response 165) will be generated by the ad server. The request context 132 may be referred to as an ad context. The supplemental content generated by the ad server may be targeted ads that target individual users that are consuming content at the publisher system.

Offline Phase. The offline phase of the protocol 150 is discussed in connection with FIG. 1 and occurs before the ad request 135 is generated. More formally, the following steps occur during an embodiment of the offline phase:

1. The advertiser (e.g. advertiser system 110) constructs the map (e.g. USM 120), M: $U_A \to \mathbb{Z}_q^{|\mathcal{C}|}$, denoted $M(u) \mapsto s_u$.
2. The advertiser represents the map M using a Cuckoo hash table T with k hash functions, where k is a small constant, preferably greater than 2.
3. The Cuckoo hash table will have some empty rows since T necessarily has >|M| rows. The advertiser fills in empty rows of the Cuckoo hash table structure with the key/value pair $(0 \in \mathcal{U}, 0 \in \mathbb{Z}_q^{|\mathcal{C}|})$.
4. The table T may be viewed as having multiple rows, where each row contains a key u∈ U and a value. The advertiser computes secret shares of T by secret-sharing each row of the table. It computes the secret share of a row by computing separate secret shares for u and $s_u$. For example, if the first row of T contains the user u and the cluster affiliation vector $s_u$, the advertiser system replaces u with $\langle u \rangle$ and $s_u$ with $\langle s_u \rangle$.
5. The advertiser provides $\langle T \rangle_A$ to the ad server 140 and $\langle T \rangle_P$ to the publisher system 130.

Figure 3A:
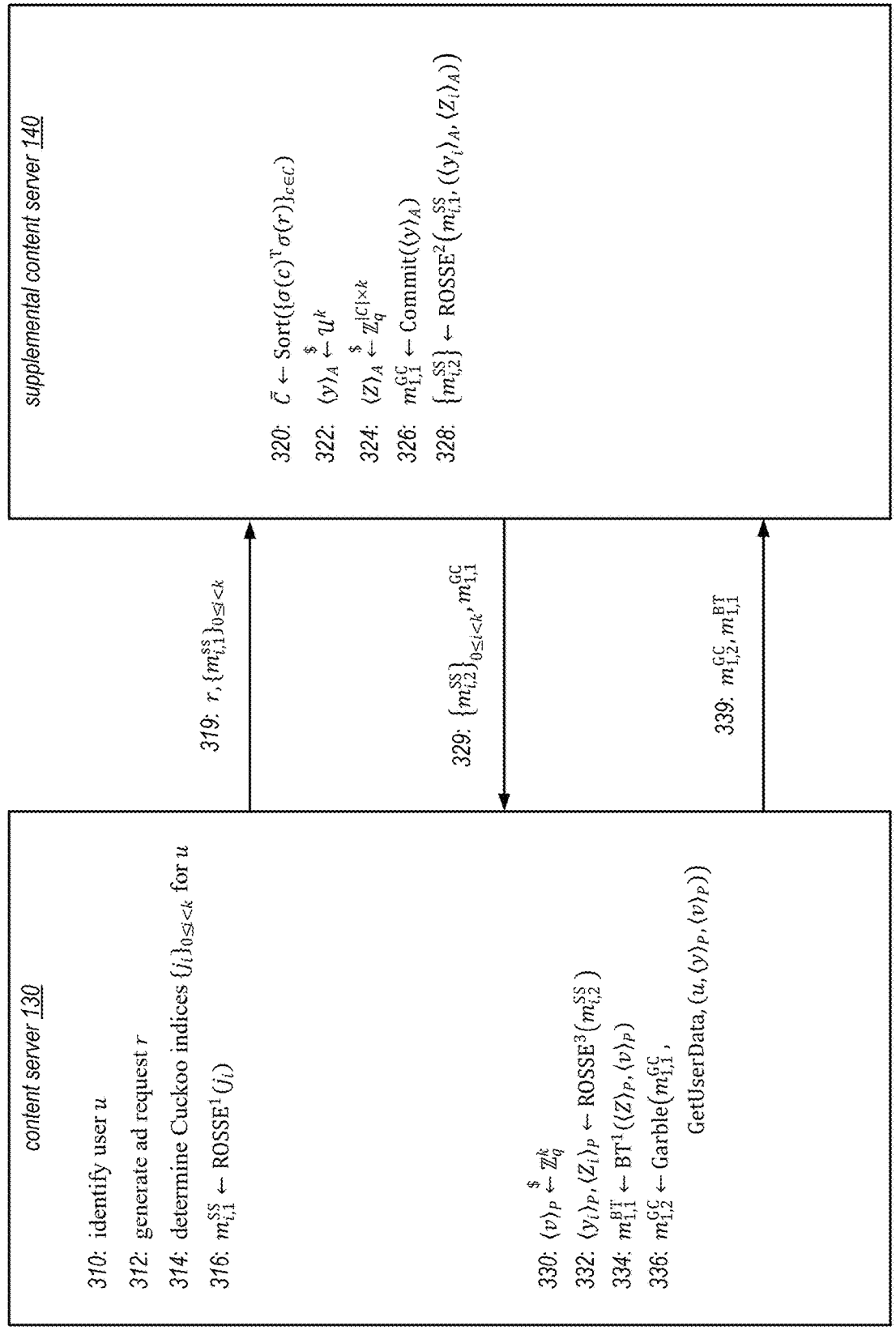
FIGS. 3A and 3B illustrate an example of a privacy preserving protocol used by the PPSCS and the content server, according to some embodiments.
Figure 3B:
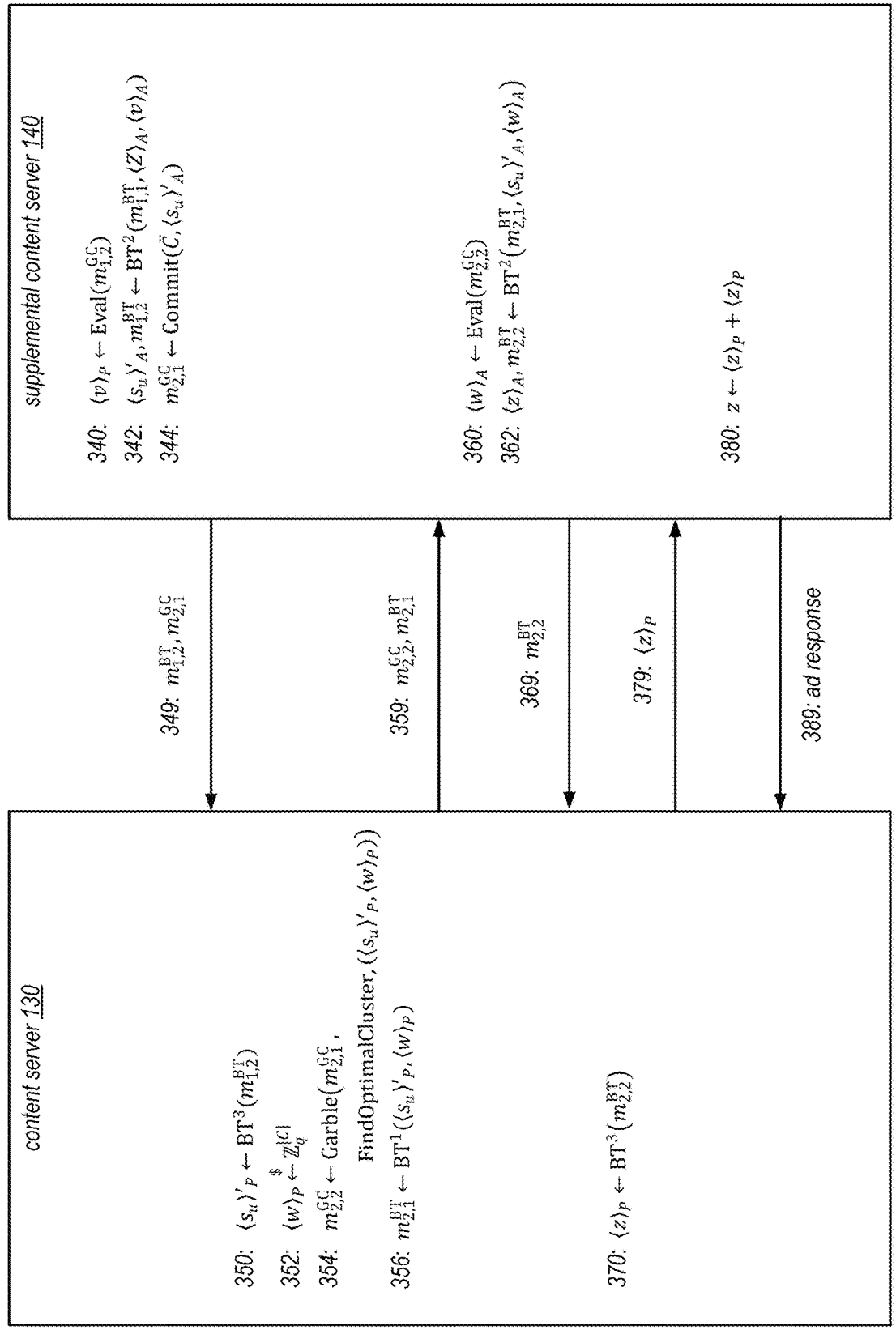

Online Phase. The online phase of the protocol 150 occurs when the ad request 135 is generated. The online phase of the protocol is depicted in FIGS. 3A and 3B. FIGS. 3A and 3B illustrate an example of a privacy preserving protocol between the PPSCS (e.g. an ad server) and the content server (e.g. a publisher system or website that publishes content for users), according to some embodiments.

Formally, the online phase may be described to occur in four logical steps:
1. The ad server 140 computes dot products of the ad request embedding with the cluster centroids, as discussed in connection with FIG. 2.
2. The ad server and the publisher system both obtain secret shares of the cluster affiliation vector $s_u$ of user u, where $$s_u = \begin{cases} T[u], & u \in U_A \\ 0 \in \mathbb{Z}_q^{|\mathcal{C}|}, & \text{otherwise} \end{cases}$$

3. The two sides execute a 2PC protocol to identify a maximal-value cluster c for which $s_{u,c} \neq 0$, or determine that which $s_{u,c} = 0$ for all $c \in \mathcal{C}$.
4. The ad server computes the user segment in c for which to serve the ad, or indicates that no user segment information is available about what ad should be served.

Step 1: Compute Dot Products. When a user u visits the publisher system 130, the publisher system initiates an ad request 135 to the ad server 140 to find a high-value ad to display to the user. In some embodiments, the ad server embeds the ad request r as $\sigma(r) \in \mathcal{V}$. The ad server computes dot products between the ad request embedding and the centroid of each cluster $\sigma(r)$ for each $c \in \mathcal{C}$. The list of clusters, denoted by $\mathcal{C}$, is sorted from largest dot product to the smallest.

In some embodiments, step 1 does not involve any user-private information: the ad request contains no user-identifying information, and the set of clusters $\mathcal{C}$ under consideration is the same for all users. Therefore, in some embodiments, this step can be done entirely in cleartext without jeopardizing user privacy or data confidentiality.

However, the ad server cannot serve a targeted ad based solely on this step since the goal is to serve an ad which is specific to the user.

Step 1 of the protocol corresponds to operations 310, 312, 319, and 320 of FIG. 3A.

Step 2: Get Secret Shares of the Cluster Affiliation Vector. The goal of this step is to compute secret shares of $$s_u = \begin{cases} T[u], & u \in U_A \\ 0 \in \mathbb{Z}_q^{|\mathcal{C}|}, & \text{otherwise} \end{cases}$$

Since $s_u$ contains private information about u, neither the ad server nor the publisher system should learn the raw value of the vector. Instead, they will learn secret shares of the value. Moreover, if u resides at row i of T, the ad server cannot learn $\langle T[i] \rangle_A$ because this value could serve as an identifier for u which would allow the ad server to track the user (and the ads served to the user) over time. As a result, the output of this step should be a fresh secret share $\langle T[i] \rangle'_A$ of T[i] (or fresh secret shares of $0 \in \mathbb{Z}_q^{|\mathcal{C}|}$). This is achieved using a combination of a randomized oblivious secret share extraction, a garbled circuit, and Beaver Triple multiplication.

First, the two sides of the protocol will obtain secret shares for all possible Cuckoo table indices associated with the user. That is, the first step will extract (fresh) secret shares for each of the k rows of T possibly corresponding to u. The publisher system uses the public parameters of the Cuckoo hash table to compute the possible indices $i_1, \ldots, i_k$ of u in T, then executes the randomized oblivious secret share extraction (ROSSE) protocol with the ad server k times to retrieve fresh secret shares for these rows. As a result, the ad server learns k new secret shares $\langle T[i_j] \rangle'_A$ for $j \in [1, k]$ without learning $i_j$, while the publishers system learns corresponding secret shares $\langle T[i_j] \rangle'_P$.

Recall that $\langle T[i_j] \rangle = (\langle u_{i_j} \rangle, \langle s_{u_{i_j}} \rangle)$. The notation may be simplified to write $\langle T[i_j] \rangle = (\langle u_j \rangle, \langle s_{u_j} \rangle)$. Let $\langle y \rangle = \{\langle u_j \rangle\}_{j \in [1,k]}$ be a column vector and $\langle Z \rangle \in \mathbb{Z}_q^{|\mathcal{C}| \times k}$ be a matrix where each column of Z is $s_{u_j}$.

The next step is to compute the target index for u. To do this, the publisher system and the ad server will execute a garbled circuit protocol to compute secret shares of $v = \{v_i \in \mathbb{Z}_q\}_{i \in [1,k]}$ where $v_i = 1$ if $u_i == u$, and $v_i = 0$ otherwise. In this example, the publisher system is the garbler. It generates random secret shares of the output $\langle v \rangle_P$ and provides inputs u, $\langle v \rangle_P$, and $\langle y \rangle_P$. The ad server is the circuit evaluator, and provides input $\langle y \rangle_A$. The output of the circuit is $\langle v \rangle_A$. The pseudocode for the garbled circuit to obtain secret shares of the user index vector is shown below:

def GetUserData (u, $\langle v \rangle_P$, $\langle y \rangle_P$, $\langle y \rangle_A$):
  for i in range (1, k+1)
    $u_i = \langle y_i \rangle_A + \langle y_i \rangle_P$
    $V_i = U_i == u$
  return $v - \langle v \rangle_P$ Finally, the two parties will compute secret shares of $s_u$. This is accomplished by executing the Beaver Triple protocol, over matrices, to perform the product $s_u = Z \cdot v$, which results in a secret share of the output of the Cuckoo table lookup. The result is that both parties learn fresh secret shares of $s_u$, independent of the secret shares in T, and independent of the secret shares in Z. The fresh secret shares are denoted by $\langle s_u \rangle'$.

Step 2 of the protocol corresponds to operations 314, 316, 319, 322, 324, 326, 328, 329, 330, 332, 334, 336, 339, 340, 342, 349, and 350 of FIGS. 3A and 3B.

Step 3: Compute Maximal Value Cluster of User. In this step, the publisher system and the ad server execute an MPC protocol to compute secret shares of a bit vector $w=w_c \in \mathbb{Z}_q\}_{c \in \mathcal{C}}$. If $u \notin U_A$, $W_c=0$ for all $c \in \mathcal{C}$. If $u \in U_A$, exactly one $W_c=1$ corresponding to the maximal-value cluster c for which u is associated with a user segment in c. The process also secret-shares w between the ad server and publisher system to avoid leaking information about the user to either party.

The two-party computation is performed using another garbled circuit. Again, in this example, the publisher system is the garbler and the ad server is the evaluator. The ad server's inputs are $\langle s_u \rangle'_A$ and $\mathcal{C}$, and the publisher system's inputs are $\langle s_u \rangle'_P$ and $\langle w \rangle_P$. The output of the circuit is $\langle w \rangle_A$. The pseudocode for this second garble circuit is provided below:

def FindOptimalCluster ($\langle s_u \rangle'_P$, $\langle w \rangle_P$, $\langle s_u \rangle'_A$, $\mathcal{C}$):
      found=False
      for c in $\mathcal{C}$
        $W_c=(\langle s_u \rangle'_A + \langle s_u \rangle'_P)$ and (not found)
        found=found or $w_c$
        $\langle W_c \rangle_A = W_c - \langle w_c \rangle_P$
      return $\langle w \rangle_A$ The garbled circuit above computes a cluster that maximizes revenue for a particular combination of ad context and user. Note that although this algorithm computes the components of w in the order of $\mathcal{C}$, w itself is not indexed with this ordering. Also note that the ordering $\mathcal{C}$ contains no information about the user, hence there is no concern about its secrecy.

Step 3 of the protocol corresponds to operations 352, 354, 356, 359, and 360 of FIG. 3B.

Step 4: Compute the Target User Segment. In order for the ad server to select an ad, the process will determine the ID of the target user segment associated with the "optimal" cluster as indicated by w. Effectively, the ad server computes the dot product $z=<w, >=<w, s_u>$. Since the publisher system and the ad server have secret shares for both of these vectors, the dot product can be computed efficiently with the Beaver Triples protocol. The publisher system sends $\langle z \rangle_P$ to the ad server so that the ad server can reconstruct the target user segment z and serve a corresponding ad. Note that if $u \notin U_A$, Z=0, so the ad server will simply serve an untargeted ad.

In some embodiments, the last step of the protocol may implement an additional measure to guard against user tracking by the ad server. Recall that, in the first message of the online phase of the protocol, the publisher system sends the ad request r to the ad server. This request r enables the ad server to determine an ordering on the segment clusters (e.g. by decreasing dot product). Suppose that, in a particular execution of the online phase, this ordering is $C_1, C_2, C_3, C_4, C_5$, and that, at the end of the execution, the ad served for user u is selected based on a segment in $C_2$. Now suppose that, in a subsequent execution of the online phase, another ad request r' induces the ordering $C_2, C_1, C_3, C_4, C_5$, on clusters, and the ad served is one for a segment in $C_1$. From this information, the ad server may be able to deduce that the user in the subsequent execution is not u. While this does not amount to an explicit algorithm for tracking users, it can be said that some private information about u will leak to the ad server over time.

A solution to preventing this type of leakage may be implemented by extending the protocol to add noise to the binary cluster membership vector in such a manner that it prevents the ad server from learning with certainty that the user in a particular execution of the online phase is in a segment in any particular cluster.

In one embodiment of the extension, in the first message 319 of the online phase, the publisher system will send not only the ad request r but also a pseudorandom bit vector V generated by the publisher system, the length of which is the number of clusters. Since the length is 5 in the example of the above paragraph, $V=(v_1, v_2, v_3, v_4, v_5)$ will be used in the rest of this explanation. In the Step 4 of the online phase, the ad server will not simply choose the highest-value cluster for u based on the dot products (or the untargeted ad if u is not in a segment in any of the clusters). It will choose the highest-value cluster, say $C_i$, $1 \leq i \leq 5$, such that u is a segment in $C_i$ and $v_i=1$ (or the untargeted ad if u is not in a segment in any of the clusters). The bit values of V will be chosen randomly, where the choice of each bit is an independent choice. with a small probability p of each bit being 0. The parameter p may be tunable and captures the tradeoff between privacy and utility that the added noise introduces to the process.

This addition to the protocol provides at least two advantages. First, the increase to the running time of the protocol will be quite small. Generating one pseudorandom string at the beginning of the online phase and performing one additional vector AND in the garbled circuit at the end of the online phase will be much less time consuming than the rest of what occurs in the online phase.

Second, the cost in lost utility will be "one-sided." Although introducing noise to enhance privacy may result in the user being shown an ad that is of less-than-optimal relevance, it will not result in the user being shown an ad that is totally irrelevant. The AND operation may result in the ad server choosing an ad for a segment that contains u but that is not the "best" segment that contains u, but it cannot cause the ad server to choose an ad for a segment that does not contain u. The act of clustering the segments imposes the same type of potential cost in utility.

FIGS. 3A and 3B depicts the protocol flow during the online phase of the privacy preserving protocol 150, in one embodiment. In FIGS. 3A and 3B:

ROSSE[1] (j) takes the index j for the first ROSSE and outputs a message $m_1^{ss}$.

ROSSE[2] ($m_1^{ss}$, pad) takes the message output by ROSSE[1] and a random pad and outputs a message $m_2^{ss}$.

ROSSE[3] ($m_2^{ss}$) takes the message output by ROSSE[1] and a random pad and outputs a message $m_2^{ss}$.

Commit (x) takes the evaluator's input x for a garbled circuit and outputs a message $m_1^{Gc}$.

Garble ($m_1^{GC}$, $\mathcal{C}$, y) takes the evaluator's commit message $m_1^{cc}$, a circuit $\mathcal{C}$, and the garbler's input y and produces a message $m_2^{Gc}$ which contains a garbled circuit and OT response. Note that the garbled circuits always output a secret-shared result, and the garbler will always provide the pad for the output as part of y.

Eval ($m_2^{GC}$) completes the OT and outputs the labels corresponding to the evaluator's inputs. The evaluator can then evaluate the garbled circuit.

The secret share values for the Beaver Triples (or "matrix triples") are pre-shared.

BT[1] (x, y) takes a secret share of x and y and outputs a message $m_1^{BT}$.

BT² ($m_1^{BT}$, x, y) takes the other secret share of x and y and outputs a message $m_2^{BT}$ and outputs a secret share of x·y.

BT³ ($m_2^{BT}$) outputs the other secret share of x·y.

Step 4 of the protocol corresponds to operations 362, 369, 370, 379, 380, and 389 of FIG. 3B.

An Embodiment of a Compressed Privacy Preserving Protocol

Figure 4:
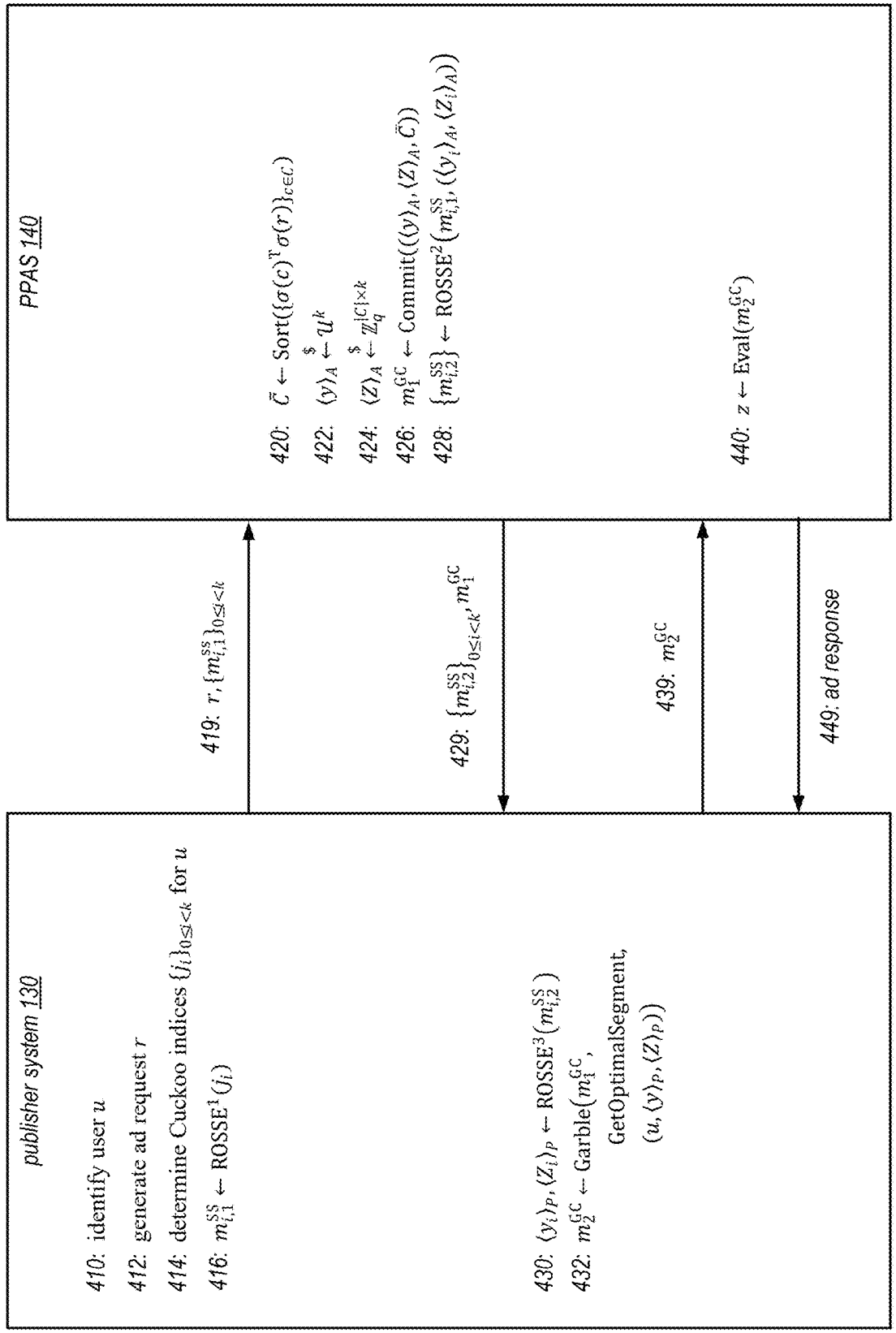
FIG. 4 illustrates another example of a privacy preserving protocol used by the PPSCS and the content server, according to some embodiments.

FIG. 4 illustrates another example of a privacy preserving protocol that may be used by the PPSCS 140 (e.g. an ad server) and the content server 130 (e.g. a content publisher system), according to some embodiments. The protocol flow shown in FIGS. 3A and 3B may be used over networks with low throughput and/or low latency characteristics. However, for networks with high throughput and/or high latency, the alternative protocol flow of FIG. 4 may be preferable.

The alternate protocol is largely the same as the cryptographic protocol described in FIGS. 3A and 3B. The difference is that instead of using Beaver Triples for multiplication operations, this protocol flow takes advantage of the fact that one multiplicand in both Beaver Triple operations is a binary vector, to integrate the multiplication into a garbled circuit. As a result, this compressed protocol flow evaluates the Beaver Triple multiplications in the garbled circuits, which reduces the number of round trips needed to carry out the protocol.

The compressed protocol flow includes three logical steps:

1. The publisher system sends an ad request to the ad server 140, which embeds the request and computes dot products, similar to step 1 of the uncompressed protocol.
2. The publisher system known the candidate row indices of the user u in the Cuckoo hash table T, where data corresponding to u might be. The parties execute k parallel ROSSE instances so that both sides learn fresh shares of these rows. This is similar to step 2 of the uncompressed protocol.
3. The publisher system 130 and ad server 140 performs a 2PC to evaluate a new garbled circuit that combines the two garbled circuits of the uncompressed protocol. The new garbled circuit will determine which, if any, of the k rows correspond to u. Then, using the data in the table, return the highest-value user segment associated with the user. This highest-value segment is used by the ad server to select the ad to target the user.

Steps 1 and 2 of the compressed protocol (operations 410, 412, 419, and 420) may be performed in a similar manner as in the uncompressed protocol. Step 3 of the compressed protocol (operations 414, 416, 422, 424, 426, 428, 429, 430, 432, 439, 440, and 449) is a modification of the uncompressed protocol and uses a just single garbled circuit.

Again, let $\langle y \rangle = \{\langle u_j \rangle\}_{j \in [1,k]}$ and $\langle Z \rangle \in \mathbb{Z}_q^{|C| \times k}$ be the output of ROSSE where y is a column vector containing the candidate user identifiers from the Cuckoo table, and Z is a matrix where each column is Z is a matrix where each column is $s_{u,j}$. The ad server and the publisher system will then perform a 2PC to evaluate the following combined garbled circuit to obtain secret shares of the optimal user segment.

def GetOptimalSegment (u, $\langle y \rangle_p$, $\langle y \rangle_A$, $\langle Z \rangle_p$, $\langle Z \rangle_A$, $C$):
    for i in range (1, k+1)
        $U_i = \langle V_i \rangle_A + \langle y_i \rangle_p$
        $V_i = U_i = u$
    found=False
    z=0 $\in \mathbb{Z}_q$
    for c in $C$
        for i in range (1, k+1)
            $Z_{c,i} = \langle Z_{c,i} \rangle_p + \langle Z_{c,i} \rangle_A$
            $s_{u,c} = \oplus_{i \in [1,k]} (Z_{c,i}$ and $v_i)$ #a bitwise and of $Z_{c,i}$ and $v_i$
        $W_c = (s_{u,c} == 0)$ and (not found)
        found=found or $w_c$
        $z^{\wedge} = (W_c$ and $s_{u,c})$
    return z Compared to the two garbled circuits of the uncompressed protocol, the above circuit adds $|C| \cdot \log_2(q) \cdot (k+1)$ AND gates, adds $|C| \cdot \log_2(q) \cdot k$ XOR gates, and removes $2|C|$ q-bit subtractions. Although the garbled circuit is larger, the compressed protocol can be completed in just two round trips using the new garbled circuit.

Figure 5:
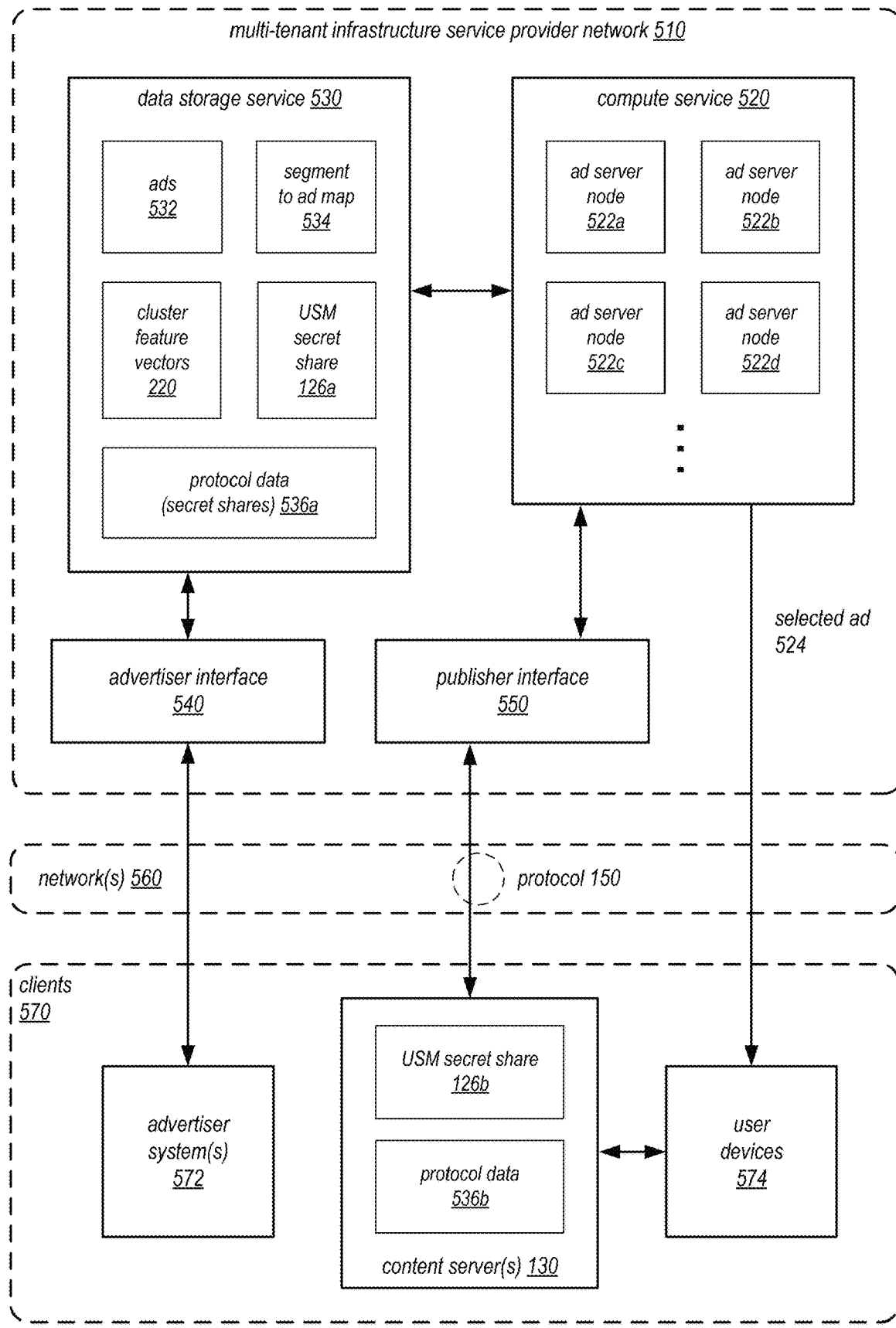
FIG. 5 illustrates an example of an ad delivery service that uses the privacy preserving protocol implemented within a multi-tenant infrastructure service provider network, according to some embodiments.

FIG. 5 illustrates an example of an ad delivery service that uses the privacy preserving protocol implemented within a multi-tenant infrastructure service provider network, according to some embodiments.

In some embodiments, the PPSCS 140 may be implemented as part of an ad delivery service using compute resources provisioned in a multi-tenant infrastructure service provider network 510. The ad delivery service may be used by many advertisers to deliver targeted ads to users via many publisher systems that are part of the ad distribution network of the service. In some embodiments, one or more of the publisher systems (e.g. content servers 130) may be a tenant of the multi-tenant infrastructure service provider network 510. In some embodiments, one or more advertiser systems 572 (e.g. user data provider systems 110) may also be implemented as a tenant within the multi-tenant infrastructure service provider 510.

The multi-tenant infrastructure service provider network 510 may be a private or closed system or may be set up by an entity such as a company or a public sector organization to provide one or more remote computing infrastructure services (such as various types of cloud-based storage) accessible via the Internet and/or other networks to clients 570 in client premises networks, in some embodiments. Service provider network 510 may be implemented in a single location or may include numerous data centers hosting various resource pools, such as collections of physical and/or virtualized computer servers, storage devices, networking equipment and the like, needed to implement and distribute the infrastructure and services offered by the provider network 510. In some embodiments, provider network 510 may implement various computing systems, resources, or services, such as a virtual private cloud (VPC) service, one or more compute service(s) 520, data storage service(s) 530, machine learning service(s), as well as other types of services. As shown in this example, the services of the provider network are used to implement components of the ad delivery service, including a fleet of ad server nodes 522a-d that implement the PPSCS 140 of FIG. 1, as well as various data stores used to store data used by the ad server nodes 522.

In various embodiments, the components illustrated in FIG. 5 may be implemented directly within computer hardware, as instructions directly or indirectly executable by computer hardware (e.g., a microprocessor or computer system), or using a combination of these techniques. For example, the components of FIG. 5 may be implemented by a system that includes a number of computing nodes (or simply, nodes), each of which may be similar to the computer system embodiment illustrated in FIG. 8 and described below. In various embodiments, the functionality of a given system or service component may be implemented by a particular node or may be distributed across several nodes. In some embodiments, a given node may implement the functionality of more than one service system component (e.g., more than one data store component).

The compute service(s) implemented by service provider network 510 offer instances, containers, and/or functions according to various configurations for client operations. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A container may provide a virtual operating system or other operating environment for executing or implementing applications. A function may be implemented as one or more operations that are performed upon request or in response to an event, which may be automatically scaled to provide the appropriate number computing resources to perform the operations in accordance with the number requests or events. A number of different types of computing devices may be used singly or in combination to implement the compute instances, containers, and/or functions of service provider network 510 in different embodiments, including general purpose or special purpose computer servers, storage devices, network devices and the like.

Compute instances, containers, and/or functions may operate or implement a variety of different services, such as application server instances, general purpose or special-purpose operating systems, services that support various interpreted or compiled programming languages such as Ruby, Perl, Python, C, C++ and the like, or high-performance computing services) suitable for performing client applications, without for example requiring the client(s) 570 to access an instance. Applications (or other software operated/implemented by a compute instance and may be specified by client(s), such as custom and/or off-the-shelf software.

As shown, the ad delivery service implements an advertiser interface 540 for advertiser systems 572 and a publisher interface 550 for the content servers 130 that implement the publisher systems. These interfaces 540 and 550 may be programmatic interfaces such as APIs or user interfaces such as GUIs.

In some embodiments, the publisher interface 550 may be implemented as part of a supply side platform (SSP) that allows content publishers to register and sell content or media as inventories of advertising "space" on which ads can be played. As shown, the publisher interface 550 may be used to carry out the privacy preserving protocol 150. As shown, in some embodiments, the ad response indicating the selected ad 524 generated by the PPSCS 140 may be transmitted directly to the user devices 574 without being forwarded by the content server 130. Thus, the content server 130 has no way of learning the actual ad that was selected for the user.

In some embodiments, the publisher side of the privacy preserving protocol may be performed by software provided to the publisher by the operator of the ad delivery service. In other embodiments, the software for performing the publisher side of the protocol may be run on compute resources in the service provider network 510, but segregated from the compute resources that access the secret shares used by the ad server nodes 522. In some embodiments, the segregation may be achieved by implementing separate regions of memory of a computing device. One example of a technology that enables such memory segregation is SOFTWARE GUARD EXTENSIONS (SGX), which is an extended set of hardware instructions for defining private memory enclaves implemented by certain INTEL processors.

In some embodiments, the advertiser interface 540 may be part of a demand side system (DSP) that allows advertisers to upload ads and purchase advertising space provided by the content publishers to play their ads. The advertiser may upload data including the ads themselves 532, a segment to ad map 534 (which may be used by ad selector 160 to select the ad), and the secret share 126a of the USM. In some embodiments, the generation of the USM secret shares 126a and 126b may be performed by the advertiser system 572, using software provided to the advertiser by the ad delivery service operator. The data storage service 530 may be used to store other types of data needed by the protocol 150, including the cluster feature vectors 220 and secret shares of various intermediate data 536a generated by the protocol. As shown, the counterpart secret shares of the USM 126b and the protocol data 536b are stored at the content server 130.

The data storage service 230 may be various types of data storage and processing services that perform general or specialized data storage and processing functions (e.g., analytics, big data querying, time-series data, graph data, document data, relational data, non-relational data, structured data, semi-structured data, unstructured data, or any other type of data processing operation) over data that is stored across multiple storage locations, in some embodiments. For example, the data storage service 530 may implement various types of databases (e.g., relational, NoSQL, document, or graph databases) for storing, querying, and updating data. Such services may be enterprise-class database systems that are scalable and extensible. Queries may be directed to a database in data store service 530 that is distributed across multiple physical resources, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via APIs.

Generally speaking, the clients 570 of the service provider network 510 may encompass any type of client configurable to submit network-based requests to service provider network 510 via network 560. For example, a given client device may include a suitable version of a web browser, or may include a plug-in module or other type of code module that may execute as an extension to or within an execution environment provided by a web browser. Alternatively, a client 570 may be a media application, an office application, or any other application that is configured to interact with the service provider network. In some embodiments, such a client application may include sufficient protocol support (e.g., for a suitable version of Hypertext Transfer Protocol (HTTP)) for generating and processing network-based services requests without necessarily implementing full browser support for all types of network-based data. As shown, the clients 570 in this example includes advertiser system(s) 572, content server(s) 130, and various user devices 574 accessible to the ad delivery service.

As shown, the clients 570 will convey network-based services requests to and receive responses from service provider network 510 via network 560. In various embodiments, network 560 may encompass any suitable combination of networking hardware and protocols necessary to establish network-based-based communications between clients 570 and service provider network 510. For example, network 560 may generally encompass the various telecommunications networks and service providers that collectively implement the Internet. Network 560 may also include private networks such as local area networks (LANs) or wide area networks (WANs) as well as public or private wireless networks. For example, a given client 570 and service provider network 510 may be respectively provisioned within enterprises having their own internal networks. In such an embodiment, network 560 may include the hardware (e.g., modems, routers, switches, load balancers, proxy servers, etc.) and software (e.g., protocol stacks, accounting software, firewall/security software, etc.) necessary to establish a networking link between given client 570 and the Internet as well as between the Internet and service provider network 510. It is noted that in some embodiments, clients 570 may communicate with service provider network 510 using a private network rather than the public Internet.

Figure 6:
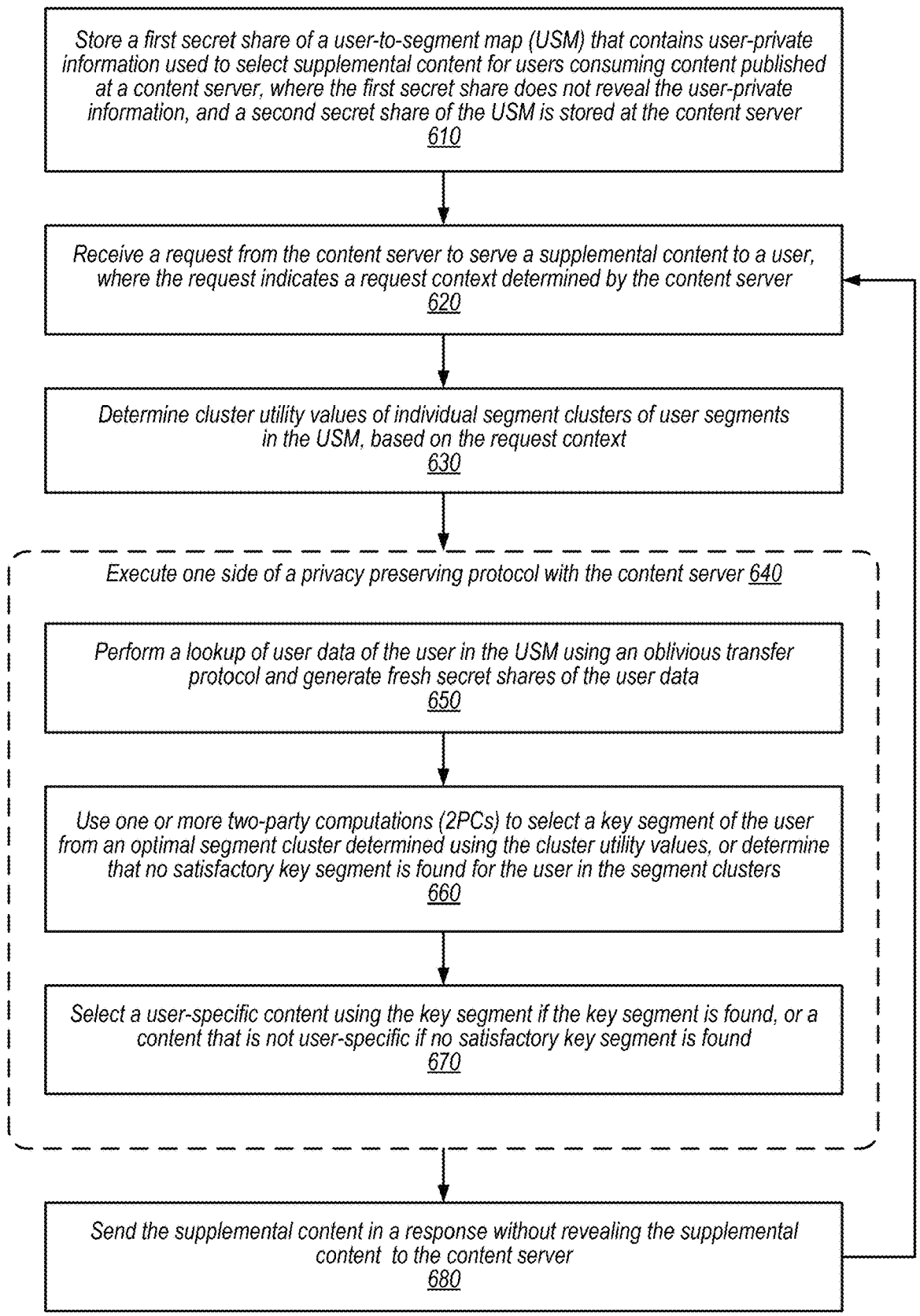
FIG. 6 is a flowchart illustrating a process performed by the PPSCS to serve a supplemental content, according to some embodiments.

FIG. 6 is a flowchart illustrating a process performed by the PPSCS to serve a supplemental content, according to some embodiments.

The process begins at operation 610, where the PPSCS 140 stores a first secret share (e.g. secret share 126a) of the USM (e.g. USM 120). The first secret share may be generated using a secret sharing process discussed in connection with FIG. 2A, and does not by itself reveal the user-private information about users (e.g. the users' membership in segments). The second secret share of the USM (e.g. secret share 126b) is stored at the content server (e.g. content server 130) which will implement the other side of the privacy preserving protocol 150. In some embodiments, the first secret share may be provided to the PPSCS by a user data provider system 110 that knows the users. Operation 610 is performed during an offline stage of the protocol 150.

At operation 620, the PPSCS receives a content request (e.g. request 135) from the content server. The request requests the PPSCS to serve supplemental content (e.g. a targeted ad) to a user who is consuming content at the content server, and may indicate both the user ID and an request context (e.g. request context 132) determined by the content server.

At operation 630, the PPSCS determines cluster utility values of clusters of user segments in the USM, based on the request context. In some embodiments, the user segments in the USM are clustered by the PPSCS during an offline stage, using a clustering technique such as k-NN. Embeddings of the centroids of the clusters (e.g. feature vectors 240) are determined and stored. In some embodiments, these cluster embeddings are machine learned to extract feature signals about the cluster that are useful in determining the advertising utility of the cluster in view of an ad context. When the request is received, the PPSCS may generate a request context embedding (e.g. feature vector 250) from the request context. The request context embedding may also be machine learning to extract important feature signals about the request context for determining the utility scores. In some embodiments, the request context embedding and each of the cluster embeddings are combined using a dot product operation to generate the cluster utility values (e.g. cluster utility values 254). The clusters may be sorted according to the cluster utility values so that they can be prioritized to identify the optimal segment cluster for the user and the request context.

As shown, operations 650, 660, and 670 are performed as part of the privacy preserving protocol 150 with the content server. The online phase of two embodiments of the privacy preserving protocol 150 are described in connection with FIGS. 3A/3B and 4. The protocol 150 will be performed using the two USM secret shares 126a and 126b to perform a lookup of a key segment of the user in the USM, which is then used to select the supplemental content to serve. The protocol guarantees that (a) the content server does not learn any user-private information about the user in the USM, (b) the PPSCS learns at most one user segment of the user (e.g. the key segment), and (c) the PPSCS cannot track the user over multiple content requests using any user-private information about the user in the USM learned during the execution of the protocol.

At operation 650, a lookup of user data of the user in the USM is performed. The lookup is performed by the two parties using an oblivious transfer protocol. The lookup also causes fresh shares of the data that was looked up to be generated by the two parties. As discussed, the lookup may be performed using the ROSSE protocol described previously. During a ROSSE, an oblivious transfer is used to avoid one side learning what was retrieved, and intermediate data are secret shared so each side does not know the results of the steps in cleartext. Moreover, secret shares of the USM are re-randomized during a ROSSE so even if a party learns of some data in the USM, it cannot be used to track the user over time. In embodiments where Cuckoo hashing is used, the ROSSE operation may be repeated k times for each of k possible hash location of the user data.

At operation 660, the PPSCS performs parts of one or more two-party computations (2PCs) with the content server to perform a series of steps (e.g. steps 152, 154, and 156) to attempt to find a key segment of the user in the USM. Operation 660 may involve determining an optimal segment cluster of the user based on the cluster utility scores of the clusters, and then identifying a key user segment in the optimal cluster. In some cases, operation 660 may determine that no satisfactory key segment can be found for the user in the segment clusters, either because the user is unknown in the USM, or because none of the user's segment clusters sufficiently matches the request context. The 2PCs used may include garbled circuits and/or Beaver Triples. In some embodiments, as in FIGS. 3A/3B, operation 660 may be performed using multiple 2PCs. In other embodiments, as in FIG. 4, operation 660 may be performed with just one 2PC.

At operation 670, the PPSCS selects a supplemented content (e.g. a targeted ad) to be served based on the results of the key segment lookup. If a key segment is found, the key segment is used to determine a supplemental content for the user. If no satisfactory key segment is found, the PPSCS may simply select a supplemental content that is not specific to the user.

At operation 680, the selected supplemental content is sent in a response (e.g. response 165) according to the content request. Depending on the embodiment, the response may be sent to the content server, which will forward the supplemental content to the user device, or directly to the user device (e.g. as instructed by the content request). In any event, the response will be sent in a manner so that the selected content is not revealed to the content server. In this way, the content server cannot track the content served to a particular user to learn private information about the user over time. As shown, the process may be repeated for repeated content requests to protect the privacy of users when user-specific supplement content is served to the users.

Figure 7:
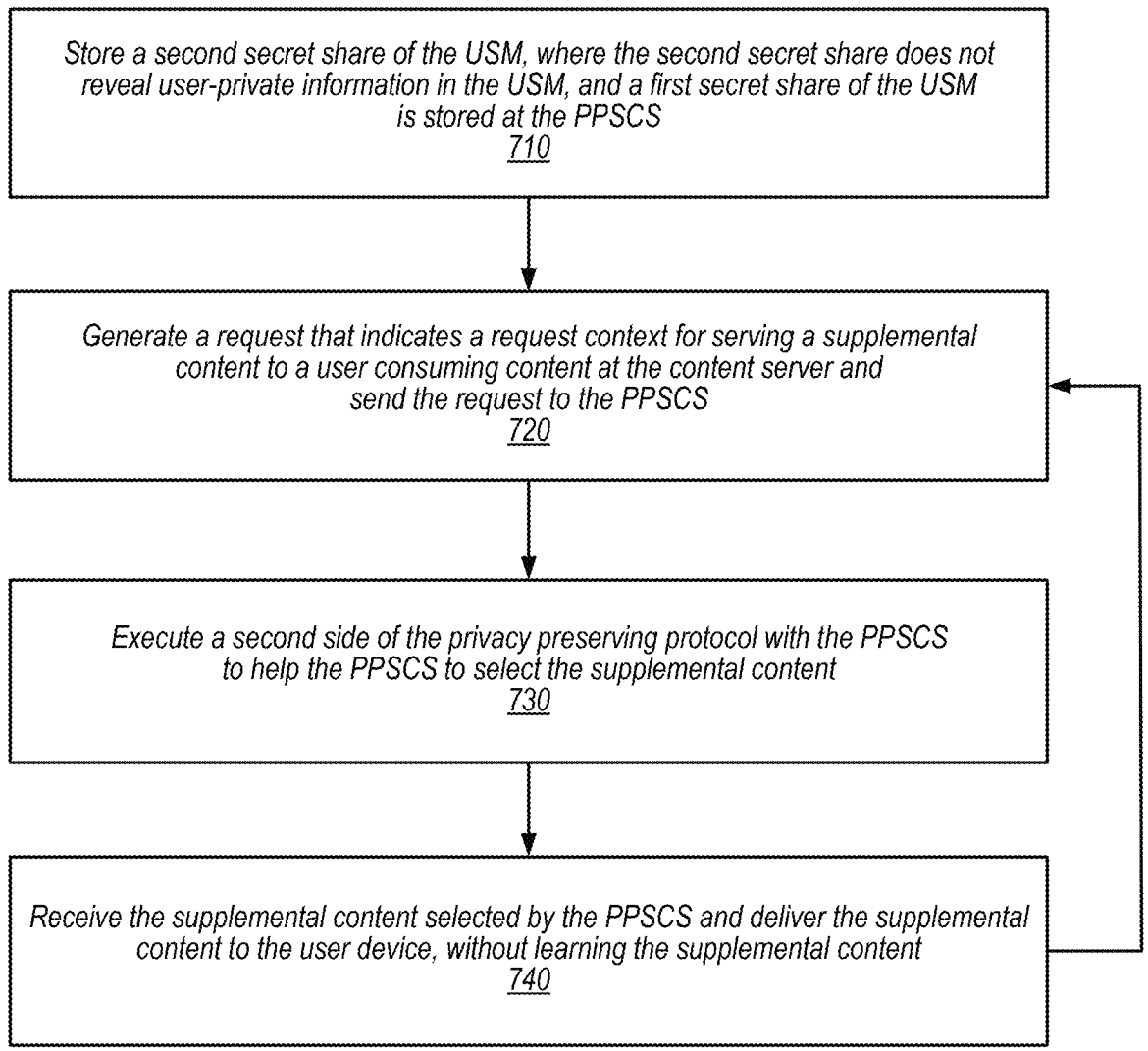
FIG. 7 is a flowchart illustrating a process performed by the content server to help the PPSCS to select supplemental content, according to some embodiments.

FIG. 7 is a flowchart illustrating a process performed by the content server to help the PPSCS to select a supplemental content, according to some embodiments.

At operation 710, the content server 130 stores a second secret share of the USM (e.g. secret share 126*b*), where the second secret share does not reveal user-private information of users in the USM, and the counterpart first secret share (e.g. secret share 126*a*) is stored at the PPSCS 140. In some embodiments, the second secret share may be provided to the content server by the user data provider system 110, which may be operated by a different party.

At operation 720, a content request (e.g. request 135) is generated and sent to the PPSCS. The request may request the PPSCS to serve a user-specific supplemental content (e.g. a targeted ad) to a user who is consuming content at the content server (e.g. viewing web content at the publisher's website). The request may indicate the request context for the requested content (e.g. request context 132) and a user ID recognized by the content server.

At operation 730, the content server executes its side of the privacy preserving protocol 150 with the PPSCS, to help the PPSCS to select the supplemental content. As discussed, the protocol (as shown in FIGS. 2A/2B, 3A/3B, and 4) will provide user privacy guarantees to limit leakage of user-private data to either party of the protocol.

At operation 740, the content server receives the supplemental content selected by the PPSCS (e.g. in a response 165), and forwards the supplemental content to the user device of the user. However, operation 740 is performed in a manner such that the content server does not learn of the supplemental content that was selected. For example, the response may encrypt the selected content in a manner that only the user device can decrypt it. As shown, the process may be repeated to request supplemental content from the PPSCS while maintaining the user privacy guarantees of the protocol.

Figure 8:
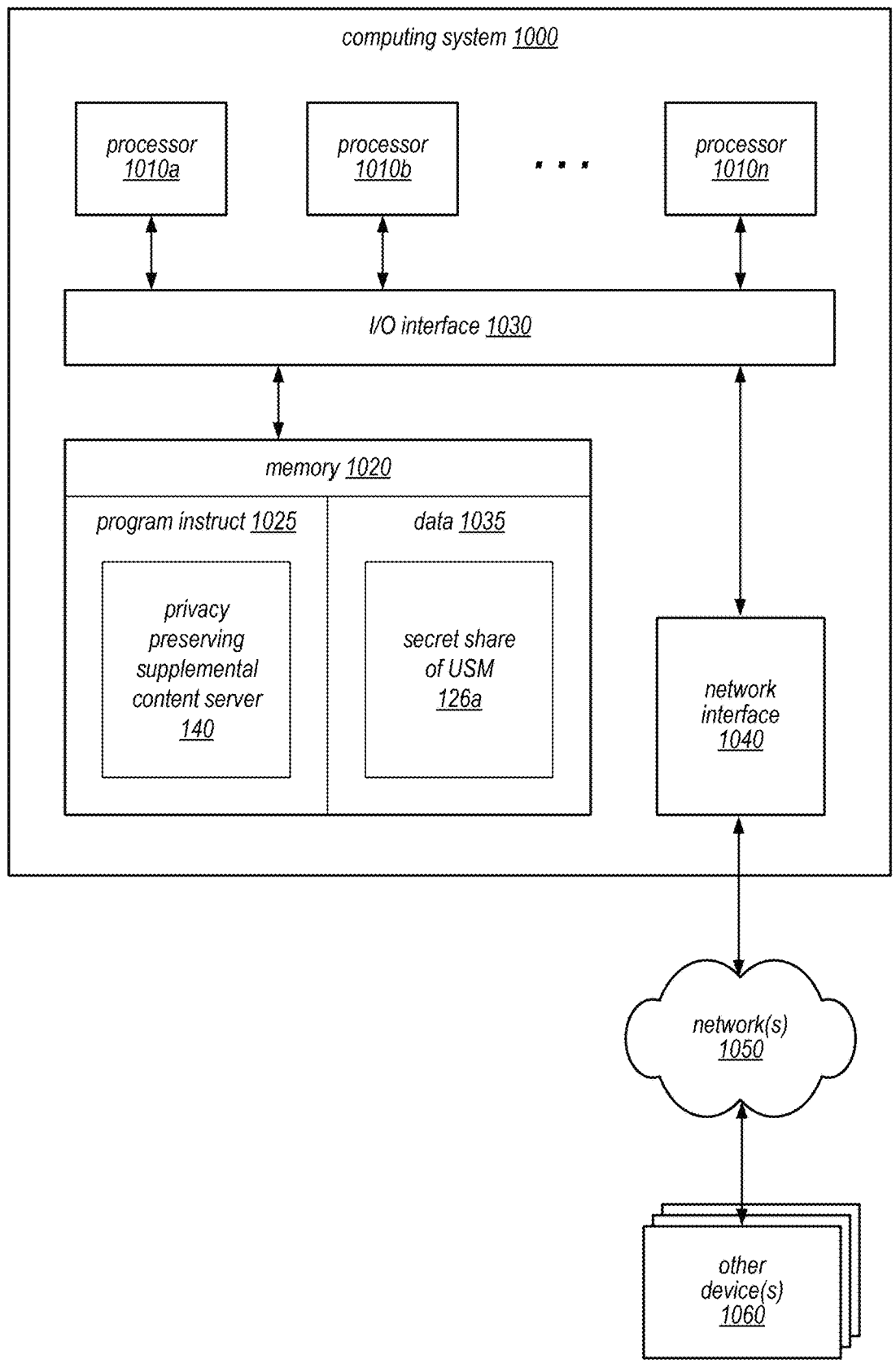
FIG. 8 is a block diagram illustrating an example computer system that can be used to implement one or more portions of the PPSCS, according to some embodiments.

FIG. 8 is a block diagram illustrating an example computer system that can be used to implement one or more portions of the PPSCS 140, according to some embodiments. The depicted computer system 1000 may also be used to implement one or more portions of the content server 130.

Computer system 1000 may include or be configured to access one or more nonvolatile computer-accessible media. In the illustrated embodiment, computer system 1000 includes one or more processors 1010 coupled to a system memory 1020 via an input/output (I/O) interface 1030. Computer system 1000 further includes a network interface 1040 coupled to I/O interface 1030.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

System memory 1020 may be configured to store instructions and data accessible by processor(s) 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 1020 as code 1025 and data 1035. As shown, in some embodiments, the program instructions memory 1025 may be used to implement one or more executable components such as the PPSCS 140 of FIG. 1. As shown, in some embodiments, the data memory 1035 may be used to store data such as the USM secret share 126*a* of FIG. 1.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices, such as routers and other computing devices, as illustrated in FIGS. 1 through 8, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, system memory 1020 may be one embodiment of a computer-accessible medium configured to store program instructions and data as described above for FIGS. 1 through 8 for implementing embodiments of methods and apparatus for traffic analysis. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or nonvolatile media such as RAM (e.g. SDRAM, DDR SDRAM, RDRAM, SRAM, etc.), ROM, etc, that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
    one or more processors with associated memory that implement a privacy preserving supplemental content server (PPSCS), configured to:
        serve supplemental content to a plurality of users when the users consume content published by a content server, wherein the supplemental content are selected based at least in part on user-private information about the users;
        store a first secret share of a user-to-segment map (USM), wherein the USM contains the user-private information about the users, wherein the first secret share does not reveal the user-private information, and wherein a second secret share of the USM is stored at the content server;
        receive a request from the content server to serve supplemental content to a user, wherein the request indicates a request context determined by the content server;
        execute one side of a privacy preserving protocol with the content server to perform a lookup of user segment data of the user in the USM based at least in part on the request context, wherein the privacy preserving protocol guarantees that:
            (a) the content server does not learn any user-private information about the user in the USM,
            (b) the PPSCS learns at most one user segment of the user, and
            (c) the PPSCS cannot track the user over multiple requests from the content server using any user-private information about the user in the USM learned during the execution;
        select the supplemental content for the request based at least in part on results of the lookup; and
        send the supplemental content in a response according to the request, wherein the response does not reveal the supplemental content to the content server.

2. The system of claim 1, wherein the PPSCS is configured to:
    cluster user segments of the users into multiple segment clusters;
    determine cluster utility values for individual ones of the segment clusters based at least in part on the request context;
    during the privacy preserving protocol, perform part of a two-party computation (2PC) with the content server to (a) select a key segment of the user from an optimal segment cluster determined using the cluster utility values, or (b) determine that no satisfactory key segment is found for the user in the segment clusters; and
    select (a) a supplemental content specific to the user using the key segment of the user when the key segment is found, or (b) a supplemental content not specific to the user when no satisfactory key segment is found.

3. The system of claim 2, wherein to perform the 2PC, the PPSCS evaluates a garbled circuit generated by the content server.

4. The system of claim 1, wherein to execute the privacy preserving protocol, the PPSCS is configured to:
    execute a part of a randomized oblivious secret share extraction (ROSSE) protocol with the content server, wherein the execution of the ROSSE protocol (a) generates fresh secret shares for one or more entries in the USM associated with the user in the USM, and (b) causes the content server and the PPSCS to learn the fresh secret shares but nothing else in the USM.

5. The system of claim 1, wherein the first secret share of the USM is implemented as a Cuckoo hash table.

6. The system of claim 1, wherein the PPSCS is implemented using compute resources provisioned in a multi-tenant infrastructure service provider network.

7. A method, comprising:
    performing, by a privacy preserving supplemental content server (PPSCS) implemented by one or more processors with associated memory:
        storing a first secret share of a user-to-segment map (USM), wherein the USM contains user-private information used to select supplemental content for users consuming content at a content server, wherein the first secret share does not reveal the user-private information, and wherein a second secret share of the USM is stored at the content server;
        receiving a request from the content server to serve supplemental content to a user, wherein the request indicates a request context determined by the content server;

executing one side of a privacy preserving protocol with the content server to perform a lookup of user segment data of the user in the USM based at least in part on the request context, wherein the privacy preserving protocol guarantees that:
  (a) the content server does not learn any user-private information about the user in the USM,
  (b) the PPSCS learns at most one user segment of the user, and
  (c) the PPSCS cannot track the user over multiple requests from the content server using any user-private information about the user in the USM learned during the execution;
selecting the supplemental content for the request based at least in part on results of the lookup; and
sending the supplemental context in a response according to the request, wherein the response does not reveal the supplemental content to the content server.

8. The method of claim 7, further comprising the PPSCS:
clustering user segments of the users into multiple segment clusters;
determining cluster utility values for individual ones of the segment clusters based at least in part on the request context;
during the privacy preserving protocol, performing part of a two-party computation (2PC) with the content server to (a) select a key segment of the user from an optimal segment cluster determined using the cluster utility values, or (b) determine that no satisfactory key segment is found for the user in the segment clusters; and
selecting (a) a supplemental contest specific to the user using the key segment of the user when the key segment is found, or (b) a supplemental content not specific to the user when no satisfactory key segment is found.

9. The method of claim 8, further comprising the PPSCS:
encoding respective centroids of the segment clusters as cluster feature vectors;
encoding the request context is as a context feature vector; and
wherein a cluster utility value is determined as a dot product of the context feature vector and a cluster feature vector.

10. The method of claim 8, wherein performing the 2PC comprises evaluating a garbled circuit generated by the content server.

11. The method of claim 8, wherein executing the privacy preserving protocol comprises the PPSCS performing parts of two or more 2PCs with the content server.

12. The method of claim 7, wherein executing the privacy preserving protocol comprises the PPSCS:
executing a part of a randomized oblivious secret share extraction (ROSSE) protocol with the content server, wherein the execution of the ROSSE protocol (a) generates fresh secret shares for one or more entries in the USM associated with the user in the USM, and (b) causes the content server and the PPSCS to learn respective ones of the fresh secret shares but nothing else in the USM.

13. The method of claim 12, wherein execution of the ROSSE protocol comprises the PPSCS executing part of an oblivious transfer protocol with the content server.

14. The method of claim 7, wherein executing the privacy preserving protocol comprises the PPSCS executing a part of a Beaver Triples protocol with the content server to compute one or more dot products of vectors or matrices.

15. The method of claim 7, wherein the first secret share of the USM is implemented as a Cuckoo hash table.

16. The method of claim 8, wherein an entry in the first secret share of the USM corresponds to an individual user, and the entry includes a cluster membership bit vector of the individual user whose bits indicate whether the individual segment clusters contain a user segment associated with the individual user.

17. The method of claim 16, wherein:
the PPSCS receives a random bit vector generated by the content server, wherein the random bit vector is of a same length as the cluster membership bit vector and contains random bit values; and
the optimal segment cluster is determined based at least in part on an AND operation performed on the cluster membership bit vector and the random bit vector.

18. The method of claim 7, wherein:
the USM is constructed by an advertiser distinct from a publisher that operates the content server; and
the PPSCS is part of an ad delivery service operated by a service operator distinct from the advertiser and the publisher.

19. One or more non-transitory computer-accessible storage media storing program instructions that when executed on one or more processors of a privacy preserving supplemental content server (PPSCS), cause the PPSCS to:
store a first secret share of a user-to-segment map (USM), wherein the USM contains user-private information used to select supplemental content for users consuming content at a content server, wherein the first secret share does not reveal the user-private information, and wherein a second secret share of the USM is stored at the content server;
receive a request from the content server to serve supplemental content to a user, wherein the request indicates a request context determined by the content server;
execute one side of a privacy preserving protocol with the content server to perform a lookup of user segment data of the user in the USM based at least in part on the request context, wherein the privacy preserving protocol guarantees that:
  (a) the content server does not learn any user-private information about the user in the USM,
  (b) the PPSCS learns at most one user segment of the user, and
  (c) the PPSCS cannot track the user over multiple requests from the content server using any user-private information about the user in the USM learned during the execution;
select the supplemental content for the request based at least in part on results of the lookup; and
send the supplemental content in a response according to the request, wherein the response does not reveal the supplemental content to the content server.

20. The non-transitory computer-accessible storage media of claim 19, wherein the program instructions when executed on the one or more processors cause the PPSCS to:
cluster user segments of the users into multiple segment clusters;
determine cluster utility values for individual ones of the segment clusters based at least in part on the request context;
during the privacy preserving protocol, perform part of a two-party computation (2PC) with the content server to (a) select a key segment of the user from an optimal segment cluster determined using the cluster utility values, or (b) determine that no satisfactory key segment is found for the user in the segment clusters; and select (a) a supplemental content specific to the user using the key segment of the user when the key segment is found, or (b) a supplemental content not specific to the user when no satisfactory key segment is found.

* * * * *